(12) United States Patent
Nagashima et al.

(10) Patent No.: US 6,304,526 B1
(45) Date of Patent: Oct. 16, 2001

(54) OPTICAL HEAD

(75) Inventors: Kenji Nagashima, Suita; Yasuhiro Tanaka, Ashiya; Tetsuo Saimi, Hirakata; Yoichi Saito, Hirakata; Yasuo Nishihara, Katano, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/266,836

(22) Filed: Mar. 12, 1999

(30) Foreign Application Priority Data

Mar. 12, 1998 (JP) .................................................. 10-060881
Mar. 23, 1998 (JP) .................................................. 10-73815

(51) Int. Cl.[7] ...................................................... G11B 7/12
(52) U.S. Cl. .................................. 369/44.23; 369/44.14; 369/112.24
(58) Field of Search ................................. 369/44.1, 44.14, 369/44.23, 44.28, 44.32, 44.37, 44.25, 54, 112, 112.01, 112.08, 112.23, 112.24, 112.26

(56) References Cited

U.S. PATENT DOCUMENTS 5,216,649 * 6/1993 Koike et al. .................. 369/44.32 X
5,301,175 * 4/1994 Nakamura ........................ 369/44.32

FOREIGN PATENT DOCUMENTS 0 762 155 A1    3/1997    (EP) .
6-333255       12/1994    (JP) .

* cited by examiner

*Primary Examiner*—Muhammad Edun
(74) *Attorney, Agent, or Firm*—Wenderoth, Lind, Ponack, L.L.P.

(57) ABSTRACT

In an optical head, two object lenses 3a, 3b fixed to a lens holder 4 are provided to serve as means for condensing a light beam 11 wherein these object lenses 3a, 3b are at positions eccentric from a support axis 10. The object lenses 3a and 3b are fabricated to satisfy prescribed conditions to suppress aberration. When either object lens 3a or 3b is selected for an optical recording medium 17, 18, degrading of signals can be prevented. Alternatively, two light sources 14, 25 are provided for one object lens 19, and the object lens is fabricated to satisfy prescribed conditions to suppress aberration. When either one of the light sources is used, degrading of signals can be prevented. In a different optical head, a recording medium 107 is set on a disk driving device 111, and an optical head 115 is provided movable freely in radial directions. The tilt of the recording medium is detected with a sensor, and the optical axis of the beam is controlled according to the detected tilt to cancel aberration.

12 Claims, 18 Drawing Sheets

OPTICAL HEAD

BACKGROUND OF THE INVENTION

1. Field of the Invention

The present invention relates to an optical head for recording and reproducing data to and from an optical recording medium.

2. Description of Prior Art

An optical disk has attracted attention as a data storage device of a large capacity. Devices employing optical disks as recording media as well as software environments thereof, have been proposed, developed and supplied commercially for applications to a large variety of technical fields. On the other hand, so-called multi-media data processing devices have also been developed in order to deal applications developed in a wide range as an integrated system. Then, it is important to develop an optical head which can access optical disks for various optical characteristics and for various purposes.

Various types of such optical heads for driving an object lens have been proposed. For instance, Japanese Patent laid open Publication 6-333255/1994, and especially FIG. 16 therein, discloses an optical head having two object lenses mounted to a single lens holder. The coma aberration of the object lens along an axis thereof is changed by a moving a magnetic yoke, and the coma aberration of the whole optical system in connection with one of the object lenses for an optical recording medium of a specified thickness is adjusted to become small. Thus, because the coma aberration of the whole optical system becomes small, reading and writing are performed without degrading signals for the optical recording medium.

It is required to use another object lens when data is recorded to and reproduced from an optical recording medium of a different thickness. However, coma aberration of the object lens is different depending on manufacturing conditions thereof, and the magnitude or direction of the coma aberration is also different depending on setting angles of the object lenses relative to a reference surface of the lens holder. Therefore, it is a disadvantage that recording and reproduction are not always good due to degradations of signals for an optical recording medium of the different thickness. Thus, in order to realize good recording and reproduction for optical recording media of various thickness with this arrangement, it is required to decrease manufacturing errors of various lenses or optical parts very much and to improve the setting accuracy of each of the optical parts. Thus, the whole system becomes quite expensive.

In an optical head shown in Japanese Patent laid open Publication 9-120027/1997, a grating is formed on a first surface of an aspherical object lens, in which aberration is corrected such that light of zeroth-order diffraction and of first-order diffractions are respectively condensed on two types of substrates of different thickness of optical disks. The whole object lens is tilted in order to correct coma aberration generated in the optical system in a manner that the tilt angle thereof with respect to the substrates of different thickness become identical.

However, light incident on the object lens is split through diffraction, and the amount of light contributing to a spot on the optical recording medium becomes smaller than that for an ordinary object lens without a grating. Thus, the intensity of the light beam of a laser diode used as a light source becomes large on recording, and the performance is degraded due to increase in heat of the laser diode or a cost thereof becomes high.

For an optical head for an optical disk, it is also required to meet a demand for high densification of optical disks. To achieve this task, it is important to decrease the diameter of a light spot used for recording and reproducing in order to decrease aberration. Therefore, it is required to reduce coma aberration as small as possible by setting the optical axis of the object lens in the optical head vertically with respect to the optical disk.

However, when tilt of the disk surface, that is, so-called disk tilt, happens due to reasons such as deformation of the optical disk, the degraded vertical relationship between the optical head and the recording surface of the optical disk, so that coma aberration is generated in the light spot and the object lens does not have its original performance. Thus, a control means will be required for decreasing coma aberration besides conventional focusing and tracking control. There have already been suggested several types of driving devices for object lens provided with such a control means.

In a conventional optical disk device for tilt control, an optical recording medium is set on a disk driving means, and an optical head is movable freely in radial directions of the optical recording medium. A tilt control motor moves the optical disk device 24 to change its tilt in radial directions of the optical recording medium. The tilt is detected with a sensor.

However, the radial tilt servo explained above is not suitable for rapid response because the whole pick-up optical system is tilted. However, since the tilt of the disk in radial directions is mostly a gentle, simple warp in the surface extending from the internal circumference to the external circumference, no rapid response is required. Then, this is not a problem previously.

However, in a system dealing with signals from optical disks of high density, tilt in tangential directions may immediately lead to degradations in signal qualities. Then, it is also required to correct tangential tilt in addition to the above-mentioned radial tilt. Since frequency components of tilt in tangential directions are higher than the revolution cycle of the disk, the servo is required to have response performance much higher frequencies than compared to cases of tilt in radial directions.

SUMMARY OF THE INVENTION

It is an object of the present invention to provide an optical head which can perform favorable recording and reproduction for a variety of optical recording media without degrading signals.

It is another object of the present invention to provide an optical head having good frequency response performance.

In a first aspect of the invention, an optical head comprises a light source which emits a light beam, and a condenser which condenses the light beam emitted by the light source to form a light spot on a recording medium. The condenser comprises first and second object lenses mounted to a lens holder provided for a plurality of kinds of optical recording medium. The first and second object lenses satisfy two conditions that $$|L t1|>|L t2|,$$

and $$|L b1|>|L b2|,$$

wherein Lt1 and Lt2 denote third order coma aberration components of wave front aberration that change when angles of optical axes of the first and second object lenses are varied by a unit angle, respectively, and Lb1 and Lb2 denote third order coma aberration components of wave front aberration that change when angles of incident light beams on the first and second object lenses are varied by a unit angle, respectively.

In a second aspect of the invention, an optical head comprises a first light source which emits a light beam, a second light source which emits a light beam in a wavelength region different from that of the first light source, and a condenser which condenses the light beam emitted by the light source to form a light spot on a recording medium. The condenser comprises an object lens mounted to a lens holder, and the object lens satisfies two conditions that $$0.5 < |Lb3|/|Lt3|,$$

and $$0.5 < |Lb4|/|Lt4|,$$

wherein Lt3 and Lt4 denote third order coma aberration components of wave front aberration that change when angles of optical axes of the first and second object lenses are varied by a unit angle relative to the incident light beams from the first light source and from the second light source, respectively, and Lb3 and Lb4 denote third order coma aberration components of wave front aberration that change when angles of incident light beams from the first light source and from the second light source on the object lens are varied by a unit angle, respectively.

In a third aspect of the invention, an optical head comprises a light source which emits a light beam, a condenser which condenses the light beam to form a light spot on a recording medium, a detector which detects tilt of the recording medium, and a controller which tilts an optical axis of the light beam according to the tilt detected by the detector.

An advantage of the present invention is that coma and astigmatic aberrations of spot light can be practically eliminated when data are recorded to and reproduced from various types of optical recording media.

Another advantage of the present invention is that an optical head has superior high frequency response.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
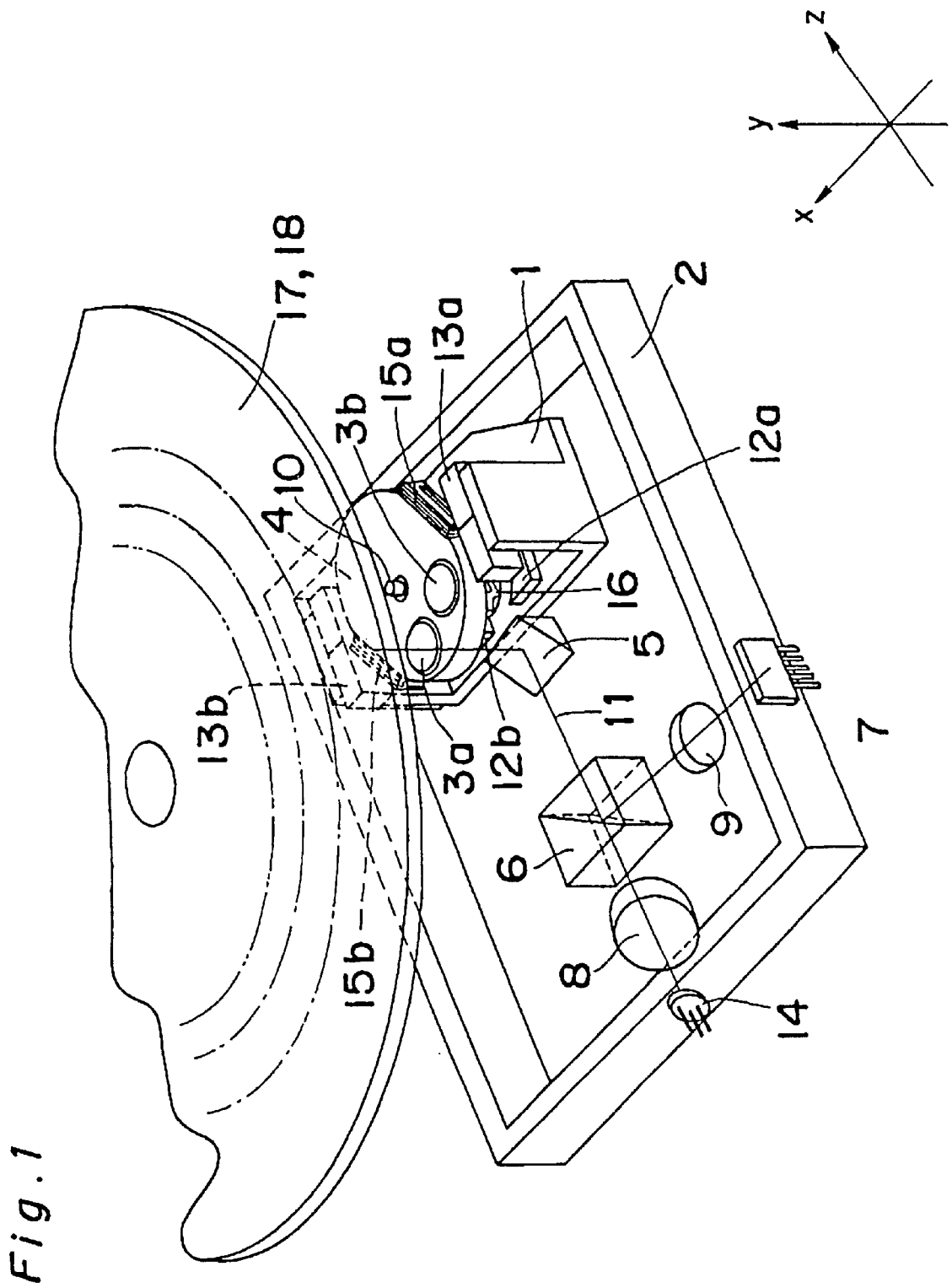
FIG. 1 is a schematic perspective view of an optical head of an embodiment of the present invention.

Referring now to the drawings, wherein like reference characters designate like or corresponding parts throughout the views, embodiments of the invention will be explained below on an optical head used for a plurality of types of optical recording media such as an optical disk.

An optical head according to a first embodiment of the invention decreases coma aberration by using object lenses having the characteristics explained below. The optical head has one light source which emits a light beam, while a condenser which condenses the light beam has two object lenses provided for a plurality of kinds of optical recording medium. In order to decrease coma aberration of a spot light on various optical recording media, the first and second object lenses satisfy two conditions that $$|Lt1| > |Lt2|, \quad (1)$$

and $$|Lb1| > |Lb2|, \quad (2)$$

wherein Lt1 and Lt2 denote third order coma aberration components of wave front aberration that change when angles of optical axes of the first and second object lenses are varied by a unit angle, respectively, and Lb1 and Lb2 denote third order coma aberration components of wave front aberration that change when angles of incident light beams for the first and second object lenses are varied by a unit angle, respectively. When an optical recording medium is set for the optical head, the kind of the optical recording medium is detected, and an appropriate object lens in the two object lenses is selected.

FIG. 1 shows schematically an example of the optical head according to the first embodiment of the present invention. A magnetic yoke 1 is fixed to an optical base 2 through means such as screws, and it can be moved in two independent directions. Magnets 12a and 12b for focusing are magnetized in vertical directions, while magnets 13a, 13b for tracking are magnetized as bi-poles in lateral directions, wherein all of these are adhesively fixed to the magnetic yoke 1. A lens holder 4 has a bearing having an axis substantially parallel to optical axes of object lenses 3a, 3b. A coil 16 for focusing is fixed to the lens holder 4 to be coaxial with the bearing.

A light beam is emitted from a laser diode 14 (which oscillating wavelength is set to be, for instance, 660 nm) which serves as a light source, and it is changed to a substantially parallel light beam 11 by a collimating lens 8. This parallel light 11 is transmitted through a beam splitter 6, and its propagation direction is then changed in a direction of the y-axis with a mirror 5. The two object lenses 3a, 3b are provided as means for condensing the light beam 11. They are fixed to the lens holder 4 at positions eccentric from a support axis 10 distant by substantially the same distances.

The light beam 11 condensed through the object lenses 3a, 3b is irradiated as a very small light spot onto a surface of optical recording medium 17, 18. This light spot makes it possible to perform recording and reproducing as well as to erase data.

The light beam 11 reflected from the optical recording medium 17, 18 is next reflected by the mirror 5 and split by the beam splitter 6 and condensed by a detecting lens 9. Finally, it is incident onto a photodetector 7. From the incident light, the photodetector 7 detects data signals recorded on the optical recording medium 17, 18. Further it detects focusing direction control signals and tracking direction error signals of the lens holder 4 holding the object lenses 3a, 3b.

If either of the optical recording medium 17 or 18 is set, the difference in thickness between the two optical recording media is discriminated. The optical recording medium 17 has a thickness of 0.6 mm and the optical recording medium 18 a thickness of 1.2 mm, for example. Then, the lens holder 4 is rotated such that either object lens 3a (which satisfies NA=0.6, for example) or object lens 3b (NA=0.4, for example) is selected in correspondence to the thickness, and the center of the selected object lens is matched with that of the light beam 11. The design wavelengths of the two object lenses 3a and 3b are different from each other. In this manner, a most suitable object lens is selected in correspondence with the optical characteristics of the optical recording medium for good recording and reproducing.

Table 1 shows examples of concrete numerical values of object lenses, and it will be explained how favorable recording and reproduction can be performed through irradiating light spots having substantially no coma aberration onto surfaces of the two types of optical recording media.

TABLE 1

Properties of object lenses

| Items on object lenses | | Object lens 3a | Object lens 3b |
|---|---|---|---|
| Focal length of object lens | (f) | 3.00 | 4.10 |
| Radius of curvature of first surface of object lens | ($R_1$) | 2.00 | 2.5588 |
| Radius of curvature of second surface of object lens | ($R_2$) | −12.5950 | −56.1547 |
| Lens thickness of object lens | (d) | 1.768 | 1.522 |
| Refractive index of object lens | (n) | 1.60277 | 1.60277 |
| Substrate thickness of disk | (t) | 0.6 | 1.2 |
| NA of object lens | (NA) | 0.6 | 0.43 |
| Conical constant of first surface | ($K_1$) | $-3.15103 \times 10^{-1}$ | $-1.18550 \times 10^{-1}$ |
| Fourth-order aspherical coefficient of first surface | ($A1_4$) | $-2.23048 \times 10^{-3}$ | $-3.15103 \times 10^{-3}$ |
| Sixth-order aspherical coefficient of first surface | ($A1_6$) | $-6.39489 \times 10^{-4}$ | $-3.15103 \times 10^{-4}$ |
| Eighth-order aspherical coefficient of first surface | ($A1_8$) | $-6.71992 \times 10^{-5}$ | $-3.15103 \times 10^{-5}$ |
| Tenth-order aspherical coefficient of first surface | ($A1_{10}$) | $-4.90831 \times 10^{-5}$ | $-3.15103 \times 10^{-5}$ |
| Conical constant of second surface | ($K_2$) | $-7.48225 \times 10^{+1}$ | $-3.15103 \times 10^{+3}$ |
| Fourth-order aspherical coefficient of second surface | ($A2_4$) | $9.36617 \times 10^{-3}$ | $-3.15103 \times 10^{-3}$ |
| Sixth-order aspherical coefficient of second surface | ($A2_6$) | $-4.68135 \times 10^{-3}$ | $-3.15103 \times 10^{-4}$ |
| Eighth-order aspherical coefficient of second surface | ($A2_8$) | $9.35410 \times 10^{-4}$ | $-3.15103 \times 10^{-4}$ |
| Tenth-order aspherical coefficient of second surface | ($A2_{10}$) | $-6.27507 \times 10^{-5}$ | $-3.15103 \times 10^{-5}$ |

The reference signs shown in Table 1 are used in common in all of the embodiments which will be explained hereinafter. It should be noted that a first surface of the object lens is defined as a surface facing the light source, and a second surface as a surface facing the disk. The disk is a parallel, flat plate. The design wavelength is set to 660 nm, and the refractive index of the disk is 1.56 in all of the cases. The focal length of the collimating lens is set to 9.0 mm.

Let us assume here that the coma aberration for the collimating lens 8 is 10 mμ in the positive direction of the x-axis, that for the object lens 3a is 20 mμ in the positive direction of the x-axis, and that for the object lens 3b is 20 mμ in a negative direction of the x-axis, respectively, depending on respective fabricating conditions of the collimating lens 8 and the object lenses 3a, 3b. (It should be noted that the coma aberration is within an effective diameter of the object lenses 3a, 3b.)

Figure 2:
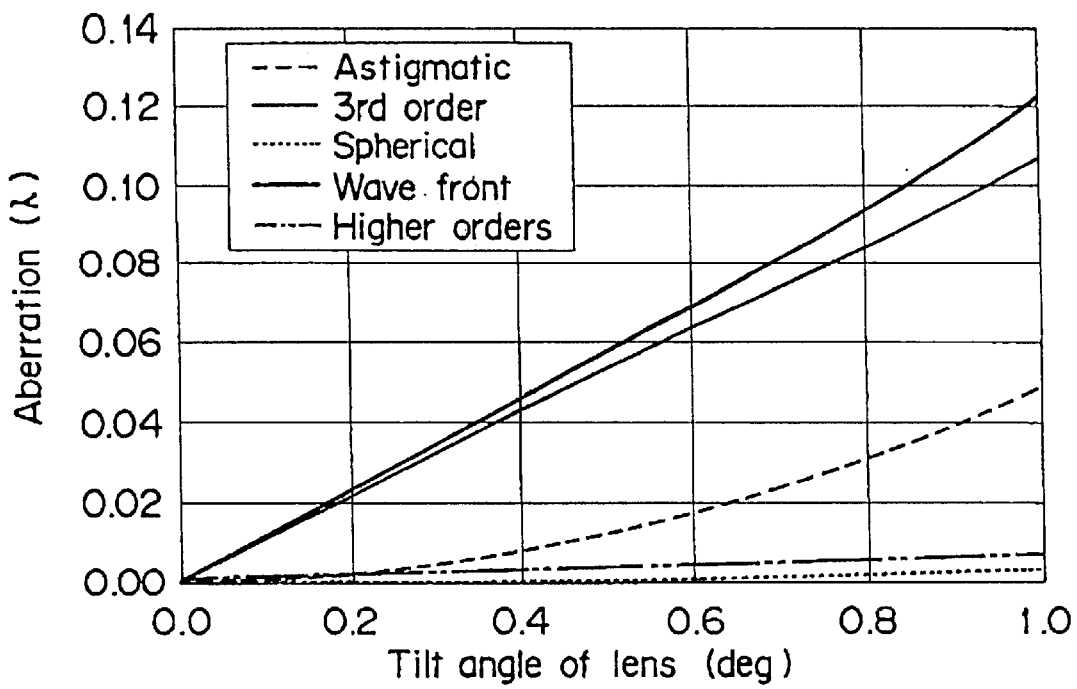
FIG. 2 is a graph of aberrations when only a first object lens is tilted in the optical head of a first embodiment.
Figure 3:
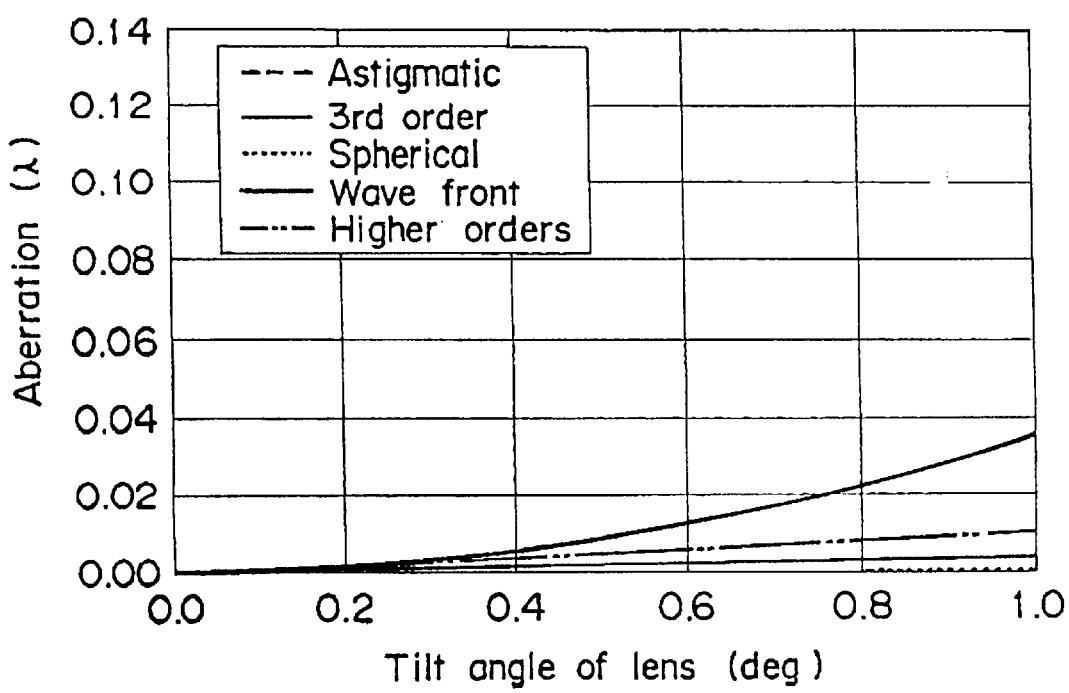
FIG. 3 is a graph of aberrations when a second object lens is tilted in the optical head of the first embodiment.
Figure 4:
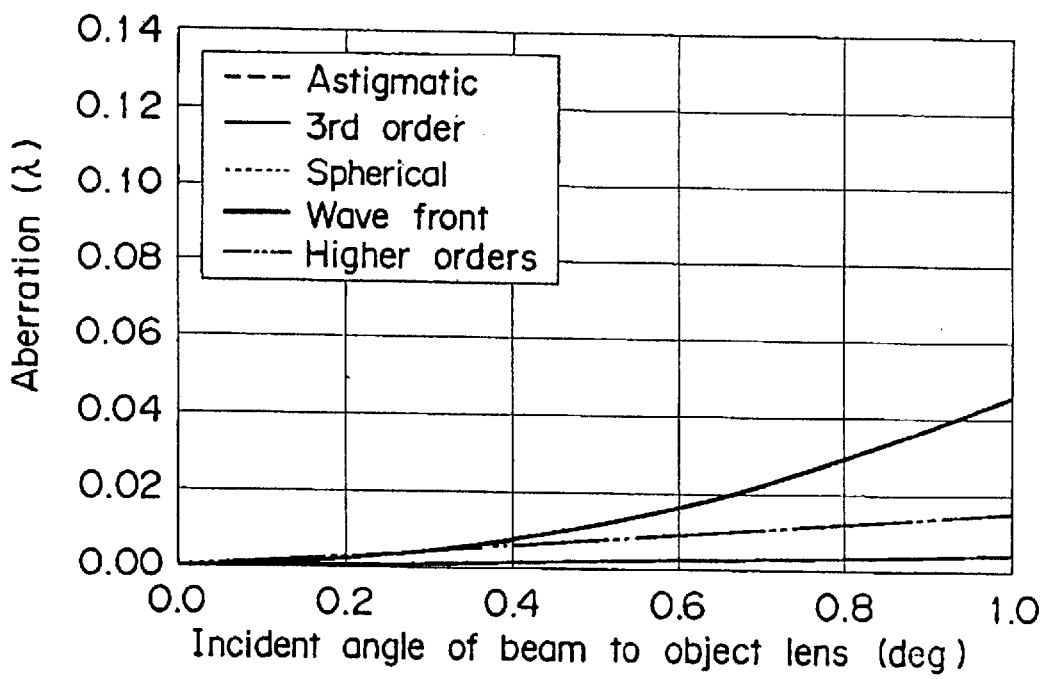
FIG. 4 is a graph of aberrations when an incident angle of a light beam with respect to the first object lens is tilted in the optical head of the first embodiment.
Figure 5:
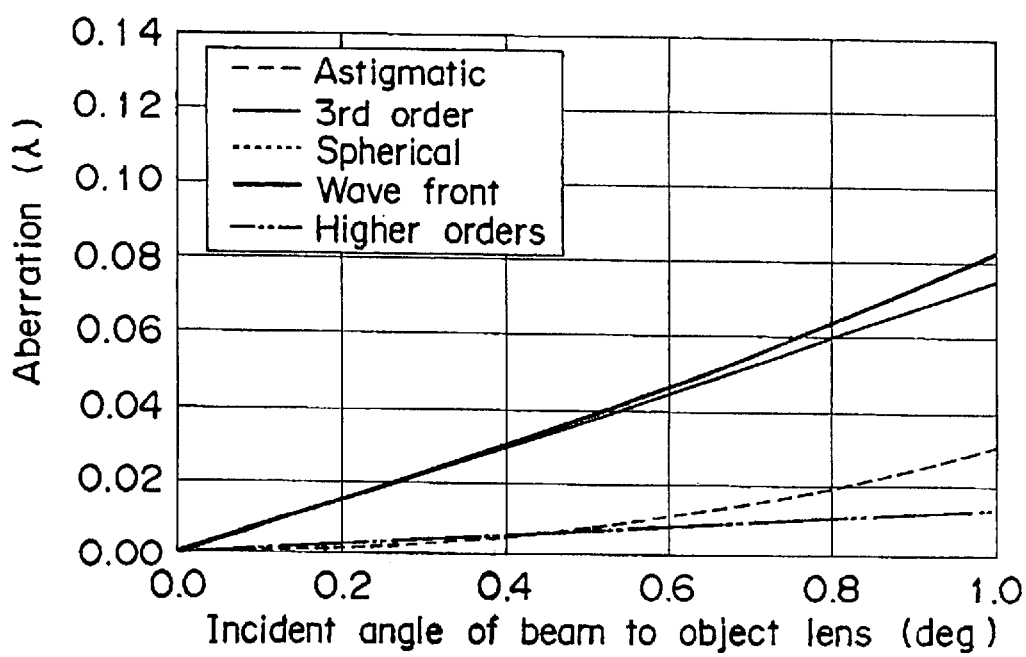
FIG. 5 is a graph of aberrations when an incident angle of a light beam with respect to the second object lens is tilted in the optical head of the first embodiment.

FIG. 2 shows variations in respective aberrations of the object lens 3a plotted against tilt angle of lens when only the object lens 3a is tilted on the optical recording medium 17, and FIG. 3 shows variations in respective aberrations when only the object lens 3b is tilted on the optical recording medium 18. Further, FIG. 4 shows variations in respective aberrations of the object lens 3a when the incident angle of the light beam 11 to the object lens 3a is tilted on the optical recording medium 17 relative to the Z-axis, and FIG. 5 shows variation in respective aberrations of the object lens 3b when the incident angle of the light beam 11 to the object lens 3b is tilted on the optical recording medium 18 relative to the Z-axis. The items shown in FIGS. 3–6 include astigmatic aberration, third-order coma aberration, spherical aberration, wave front aberration and higher orders aberration.

It can be understood based on linear slopes of straight lines on third order coma aberration in FIGS. 2, 3, 4 and 5, that $$Lt1=0.107(m\mu/deg), \quad (3)$$

$$Lt2=0.004(m\mu/deg), \quad (4)$$

$$Lb1=0.004(m\mu/deg), \quad (5)$$

and $$Lb2=0.075.(m\mu/deg). \quad (6)$$

Then, it is found that the object lenses 3a and 3b satisfy the above-mentioned two relationships:

$$|Lt1|>|Lt2|, \quad (1)$$

and $$|Lb1|<|Lb2|, \quad (2).$$

Figure 6:
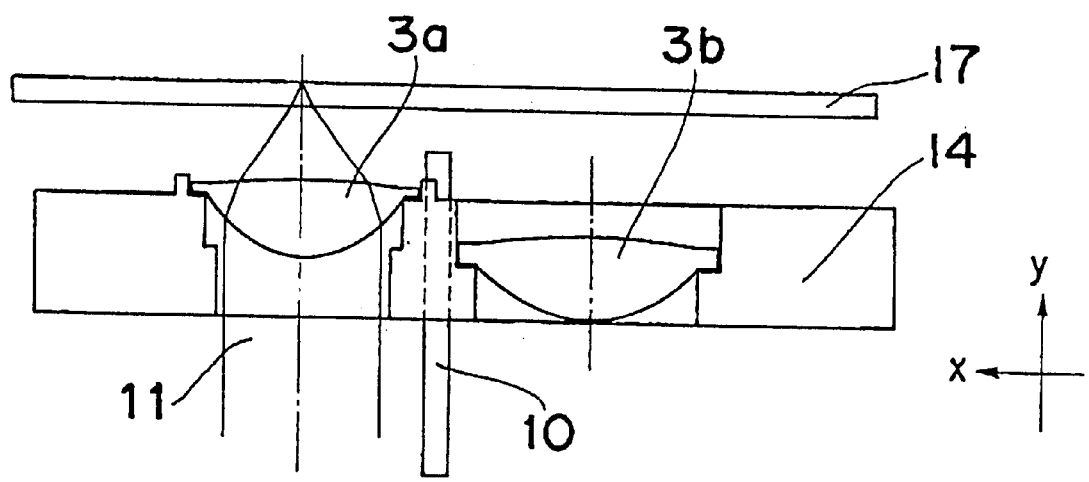
FIG. 6 is a first enlarged sectional view of a periphery of the object lenses in the optical head of the first embodiment.

As shown in FIG. 6, in this embodiment, the optical recording medium 17 is set such that the light beam 11 is incident thereon vertically, the object lenses 3a and 3b are mounted to the lens holder 14 such that both central axes thereof becomes parallel, and the lens holder 14 is attached to the optical base 2 such that the central axes are parallel to the light beam 11. The support axis 10 is also attached horizontally with respect to the light beam 11.

Then, the light beam 11 which has been condensed through the object lens 3a is irradiated as a minute light spot on the surface of the optical recording medium 17. The light spot has coma aberration of 30 m$\mu$ in the positive direction of the x-axis due to superposition of the coma aberration of the collimating lens 8 and that of the object lens 3a.

Figure 7:
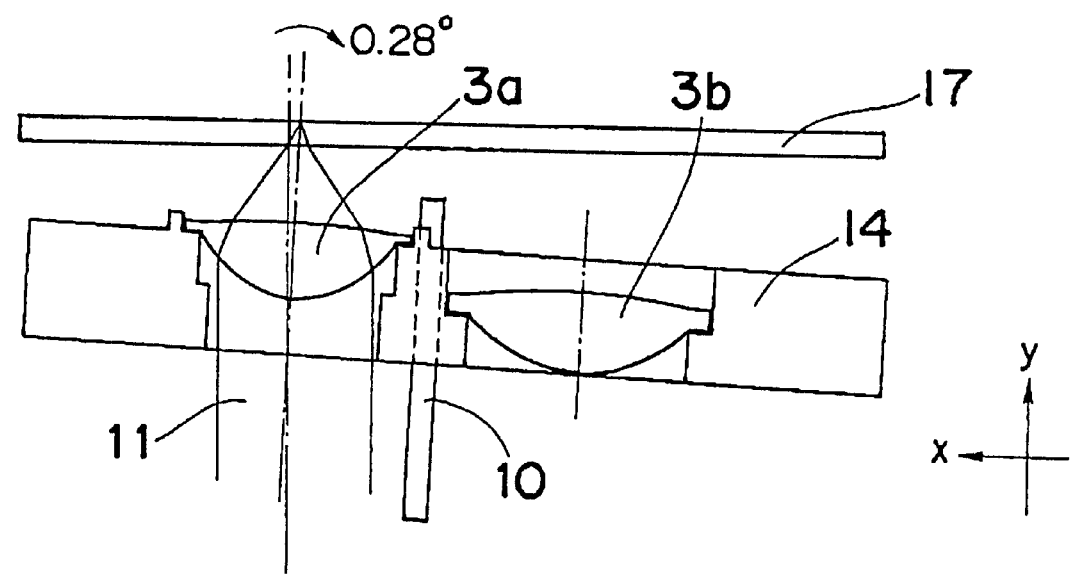
FIG. 7 is a second enlarged sectional view of the periphery of the object lenses of the optical head in the first embodiment.
Figure 8:
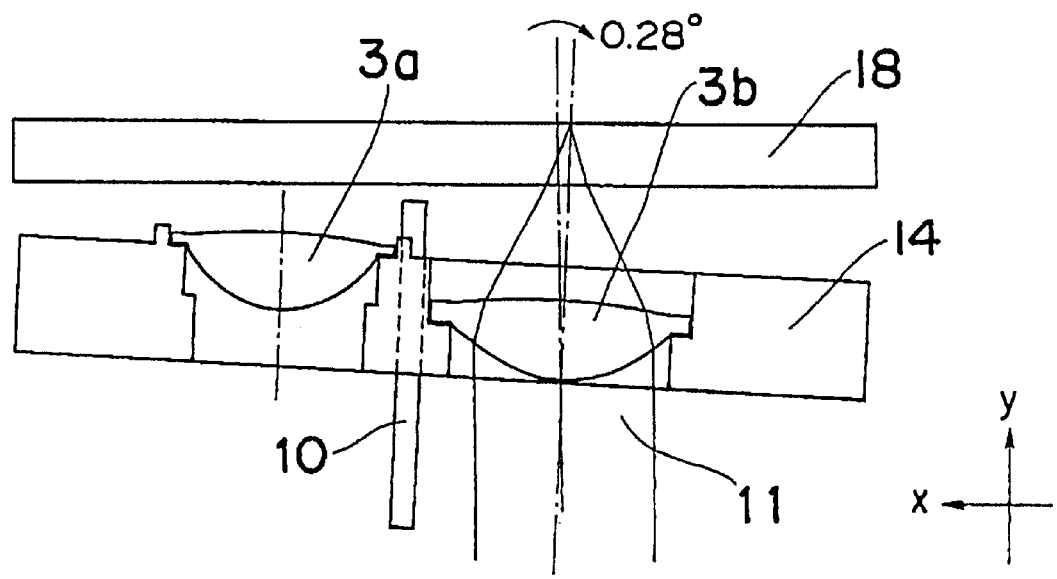
FIG. 8 is a third enlarged sectional view of the periphery of the object lenses of the optical head in the first embodiment.

In order to cancel the coma aberration of the light spot, the support axis 10 is tilted by approximately 0.28° in a direction shown in FIG. 7. Then, the coma aberration is varied by 30 m$\mu$ in the negative direction of the x-axis as shown by equation (3), and the coma aberration of the light spot can be canceled. It should be noted that the angle of tilt for the support axis is represented as 2.8° (ten times as large as 0.28°) in FIG. 7 for the ease of understanding.

Next, the optical recording medium 18 is set vertically with respect to the light beam 11, and the lens holder 14 is rotated around the support axis 10 such that the center of light beam 11 is coincident with the center of the object lens 3b. At this time, the central axis of the object lens 3b is also tilted with respect to the axis of the light beam 11 by 0.28°, similarly to the object lens 3a, because the object lenses 3a and 3b are attached to the lens holder 14 such that the central axes of thereof are parallel.

At this time, the light beam 11 which has been condensed through the object lens 3b is irradiated as a minute light spot on the surface of the optical recording medium 18. There exists in the light spot a coma aberration of 10 m$\mu$ in a negative direction of the x-axis due to superposition of the coma aberration of the collimating lens 8 and that of the object lens 3b. Further, since an additional coma aberration of 1 m$\mu$ exists owing to the tilt of the lens by 0.28° as shown by equation (4), the total coma aberration amounts to 11 m$\mu$.

Figure 9:
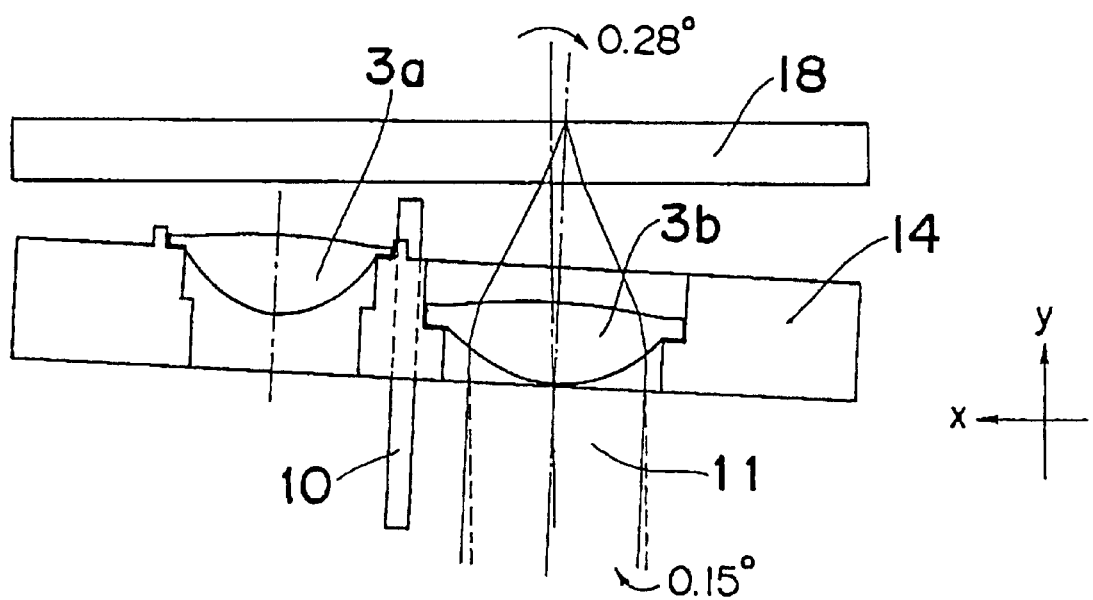
FIG. 9 is a fourth enlarged sectional view of the periphery of the object lenses of the optical head in the first embodiment.

In order to cancel the coma aberration of the light spot, the light beam 11 is tilted by approximately 0.15° in a direction as shown in FIG. 9. Then, the coma aberration of the light spot is varied by 11 m$\mu$ in the positive direction of the x-axis as shown by equation (6), so that the coma aberration can be canceled. It should be noted that the angle of tilt for the support axis is represented as 1.5° (ten times as large as 0.15°) in FIG. 9 for the ease of understanding.

Figure 10:
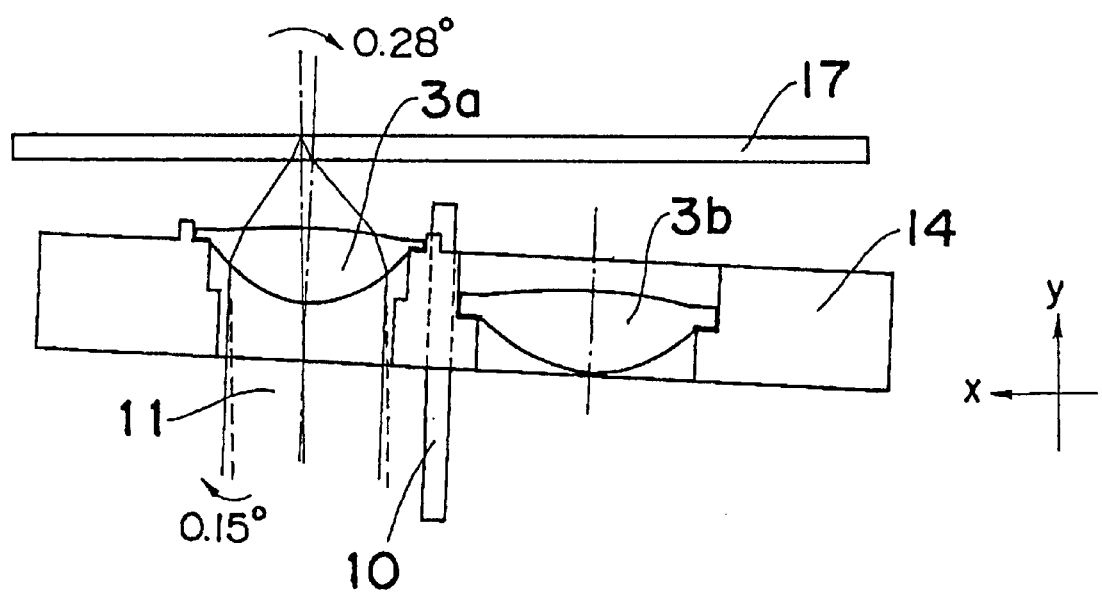
FIG. 10 is a fifth enlarged sectional view of the periphery of the object lenses in the optical head of the first embodiment.

Next, as shown in FIG. 10, the optical recording medium 17 is set again, and the lens holder 14 is rotated such that the center of light beam 11 is coincident with the center of the object lens 3a. The light beam 11 that has been condensed by the object lens 3a is irradiated as a minute light spot on the surface of the optical recording medium 17. At this time, the light beam 11 is tilted by 0.15° in a direction as shown in FIG. 10 in order to perform adjustment to cancel the coma aberration of the object lens 3b, which in turn results in small coma aberration of 0.6 m$\mu$ as shown by equation (5). This value is in a negligible range.

By performing adjustment in the above described manner, adjustment can be performed to result in practically no coma aberration either when a minute light spot of the light beam 11 is formed on the optical recording medium 17 by using the object lens 3a and when it is formed on the optical recording medium 18 by using the object lens 3b. Then, favorable recording and reproduction are possible free of degradations of signals on recording and on reproduction.

It should be noted that while the present embodiment has been explained based on a case in which the object lenses are single lenses with both aspherical surfaces, it can be understood that similar advantages can be realized by using unit lenses comprised of a plurality of lenses.

Further, the lens holder employed in this embodiment is held by the support axis in a freely rotatable and slidable manner. However, it may be replaced by a lens holder supported by four metallic suspensions to be translational in a focusing direction (direction of y-axis in FIG. 1) and in a tracking direction (direction of x-axis in FIG. 1) for use in an optical head, whereby similar advantages can be obtained.

It should also be noted that the object lenses used in the embodiment preferably have a most suitable numerical aperture (NA) depending on the film thickness of the various optical recording media or on the recording density thereof.

When the recording films of various optical recording media are different in wavelength sensitivities of their recording films or in recording densities, it is preferable that a plurality of laser diodes are provided to serve as light sources to generate light spots of wavelength bands suitable for each of the optical recording media. In this case, it is preferable that the object lenses theoretically designed in accordance with respective wavelengths of light beams are used in order to generate favorable light spots.

Next, an optical head according to a second embodiment of the invention is explained. The optical head decreases coma aberration by using an object lens having the characteristics explained below. The optical head has two light sources which emit light beams of different wavelengths for a plurality of kinds of optical recording medium. When an optical recording medium is set for the optical head, the kind of the optical recording medium is detected, and an appropriate light source in the two light sources is selected. A condenser which condenses the light beams has one object lens. In order to decrease coma aberration of a spot light on various optical recording media, the object lens satisfies two conditions that $$0.5 < |Lb3|/|Lt3|, \quad (7)$$

and $$0.5 < |Lb4|/|Lt4|, \quad (8)$$

wherein Lt3 and Lt4 denote third order coma aberration components of wave front aberration that change when angles of optical axes of the first and second object lenses are varied by a unit angle relative to the incident light beams from the first light source and from the second light source, respectively, and Lb3 and Lb4 denote third order coma aberration components of wave front aberration that change when angles of incident light beams from the first light source and from the second light source on the object lens are varied by a unit angle, respectively. If $0.5 \geq |Lb3|/|Lt3|$, the coma variation due to the tilt of the object lens itself becomes larger than that due to the tilt of the incident beam onto the object lens. Then, the coma aberration is affected by the performance of the object lens itself. Then, it is desirable that $0.5 < |Lb3|/|Lt3|$. The same holds for $|Lb4|/|Lt4|$.

Figure 11:
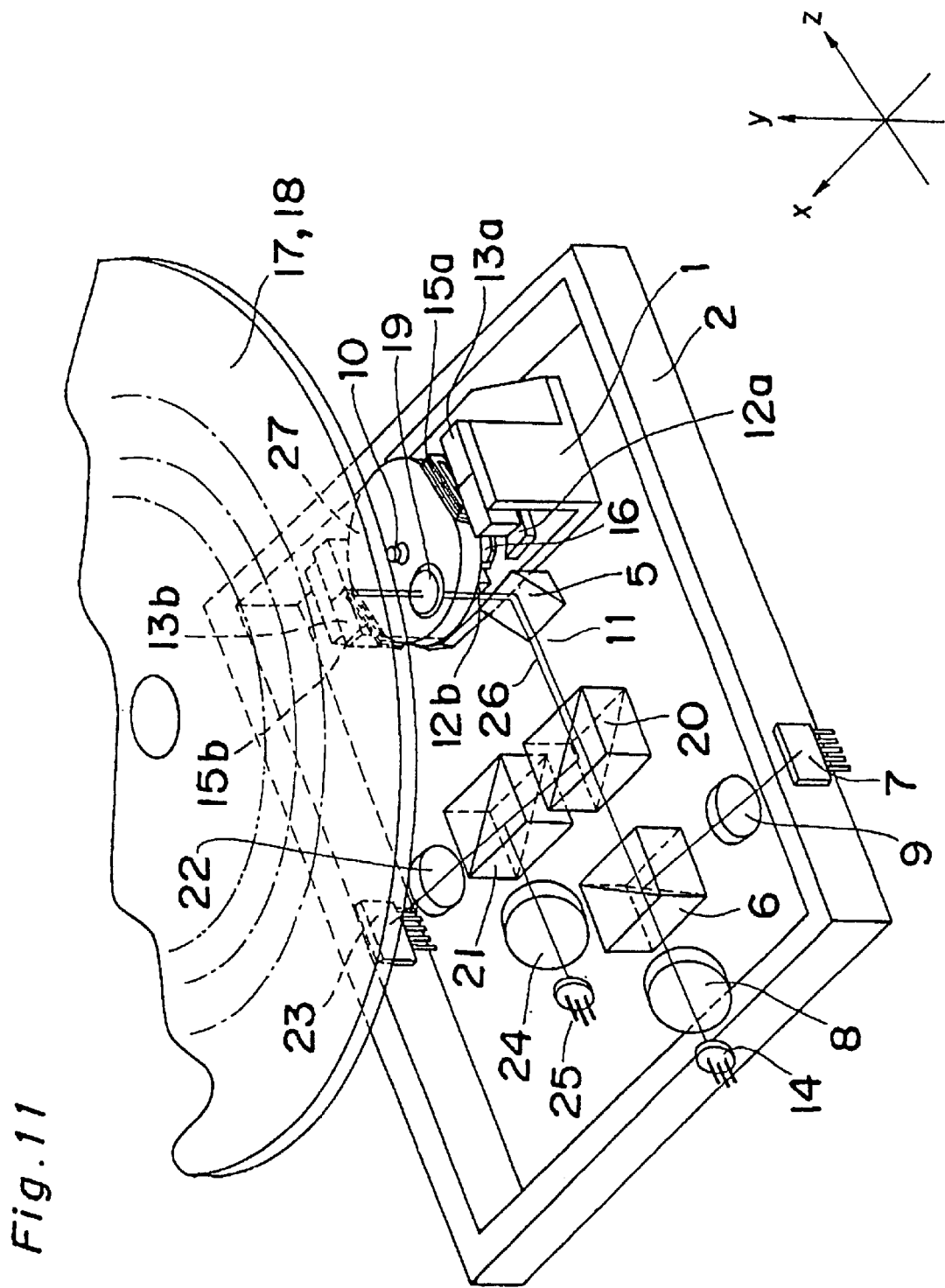
FIG. 11 is a schematic perspective view of an optical head of a second embodiment of the present invention.

FIG. 11 shows an example of the optical head according to the second embodiment of the present invention, and FIG. 12 is an enlarged view of a periphery of an object lens 19. The optical head is similar to that shown in FIG. 1, except that it comprises, besides the laser diode 14 serving as a light source (whose oscillating wavelength is set to 660 nm, for example), another laser diode 25 (whose oscillating wavelength is set to 795 nm, for example) and that only one object lens 19 is used. Further, according to this arrangement, there are further arranged a collimating lens 24, a beam splitter 21, a detecting lens 22, and a photodetector 23, each of which are suited to the characteristics of the laser diode 25. The object lens 19 is attached to a bobbin 27 as a single object lens.

In FIG. 11, the beam splitter 20 transmits the light having a wavelength band of the laser diode 14 (e.g. 660 nm) fully and reflects the light having a wavelength band of the laser diode 25 (e.g. 800 nm) fully. Then, a light emitted from the laser diode 14 is only different from that of the optical head of the first embodiment in a point that it is passed through the beam splitter 20. Similarly, a light emitted from the laser diode 25 is only different from that of the optical head of the first embodiment only in a point that it is reflected by the beam splitter 20.

Figure 12A:
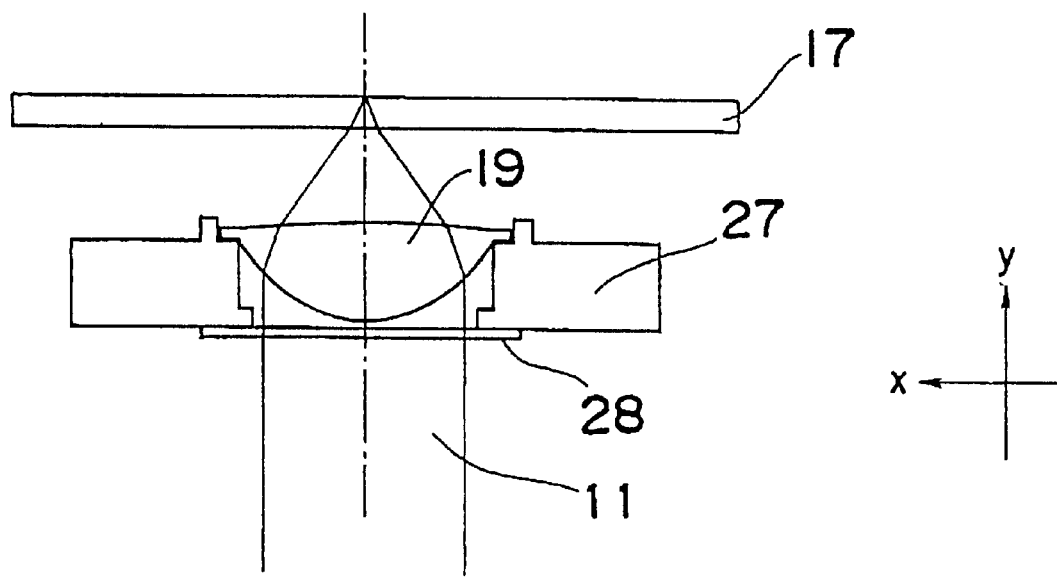
FIGS. 12A and 12B are enlarged sectional views of a periphery of an object lens of the optical head of the second embodiment for different optical recording media.
Figure 12B:
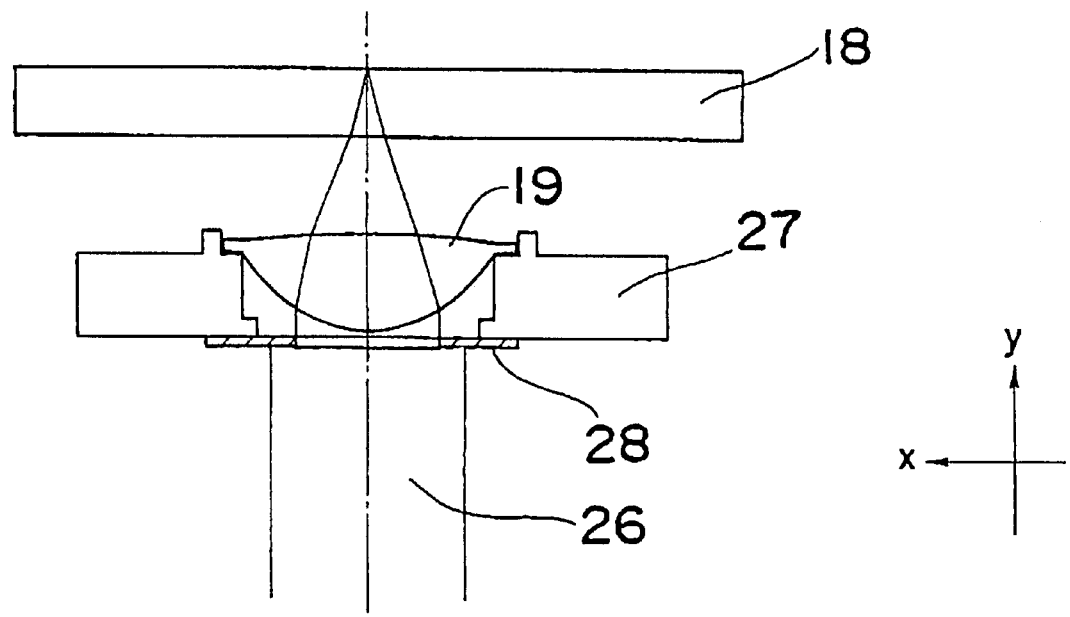

As shown in FIG. 12A, when the optical recording medium 17 is set to the optical head, recording and reproduction are performed by utilizing a light beam 11 emitted from the laser diode 14, while as shown in FIG. 12B, when the optical recording medium 18 is set, recording and reproduction are performed by utilizing a light beam 26 emitted from the laser diode 25. An aperture filter 28 is attached to a lower surface of the laser holder 27, wherein the filter is of wavelength-dependent type. It transmits light having a wavelength band of the laser diode 14 fully, while it has an aperture of diameter of 2.1 mm for a light having a wavelength band of the laser diode 25.

Table 2 shows examples of concrete numerical values of the object lens, and it will be explained how recording and reproduction can be performed favorably by using a light spot having practically no coma aberration on surfaces of two types of optical recording media.

TABLE 2

Properties of object lens

| Items on object lens 19 | | Values |
|---|---|---|
| Focal length of object lens | (f) | 3.00 |
| Radius of curvature of a first surface of object lens | ($R_1$) | 2.20 |
| Radius of curvature of a second surface of object lens | ($R_2$) | −7.08716 |
| Lens thickness of object lens | (d) | 1.768 |
| Refractive index of object lens | (n) | 1.60277 |
| Substrate thickness of disk | (t) | 0.6 |
| NA of object lens | (NA) | 0.6 |
| Conical constant of first surface | ($K_1$) | $-2.79152 \times 10^{-1}$ |
| Four-order aspherical coefficient of first surface | ($A1_4$) | $-1.16538 \times 10^{-3}$ |
| Sixth-order aspherical coefficient of first surface | ($A1_6$) | $-6.23920 \times 10^{-4}$ |
| Eighth-order aspherical coefficient of first surface | ($A1_8$) | $-8.86680 \times 10^{-5}$ |
| Tenth-order aspherical coefficient of first surface | ($A1_{10}$) | $-2.20970 \times 10^{-5}$ |
| Conical constant of second surface | ($K_2$) | $-4.27508 \times 10^{+1}$ |
| Fourth-order aspherical coefficient of second surface | ($A2_4$) | $8.88185 \times 10^{-3}$ |
| Sixth-order aspherical coefficient of second surface | ($A2_6$) | $4.46658 \times 10^{-3}$ |
| Eighth-order aspherical coefficient of second surface | ($A2_8$) | $9.5272 \times 10^{-4}$ |
| Tenth-order aspherical coefficient of second surface | ($A2_{10}$) | $-8.22884 \times 10^{-5}$ |

It is assumed here on the collimating lenses 8, 24 and the object lens 19 that the coma aberration for the collimating lens 8 is 10 mμ in the positive direction of the x-axis (it should be noted that the coma aberration is within an effective diameter of the object lens 19 which satisfies NA=0,6), that for the collimating lens 24 is 10 mμ in a negative direction of the z-axis (it should be noted that the coma aberration is within an effective diameter of the object lens 19 which satisfies NA=0.35), and that for the object lens 19 is 30 mμ in the positive direction of the x-axis in an effective diameter of NA=0.6 while no coma aberration exists in the positive direction of the x-axis in an effective diameter of NA=0.35, respectively, depending on respective manufacturing conditions of the lenses. Further, the collimating lens 24 is assumed to have a spherical aberration of an inverse sign to cancel the spherical aberration of the light spot of the light beam 26 formed on the optical recording medium 17.

Figure 14A:
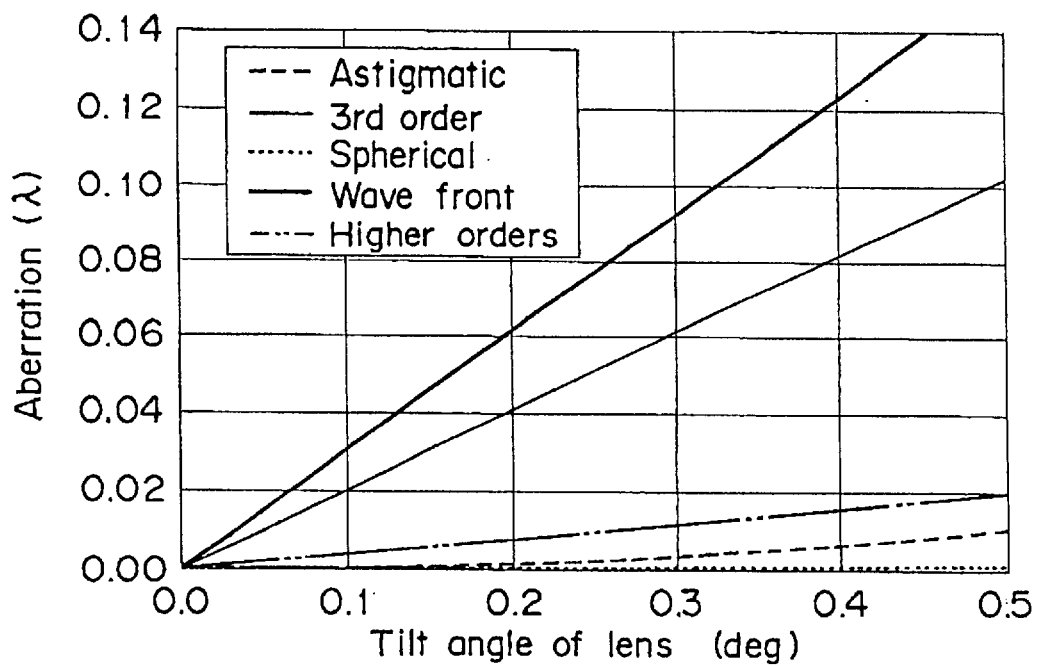
FIG. 14A is a graph of the relationship between respective aberrations when an object lens (diameter of lens aperture 3.6, NA=0.6) is tilted on an optical recording medium (thickness 0.6 mm)
Figure 14B:
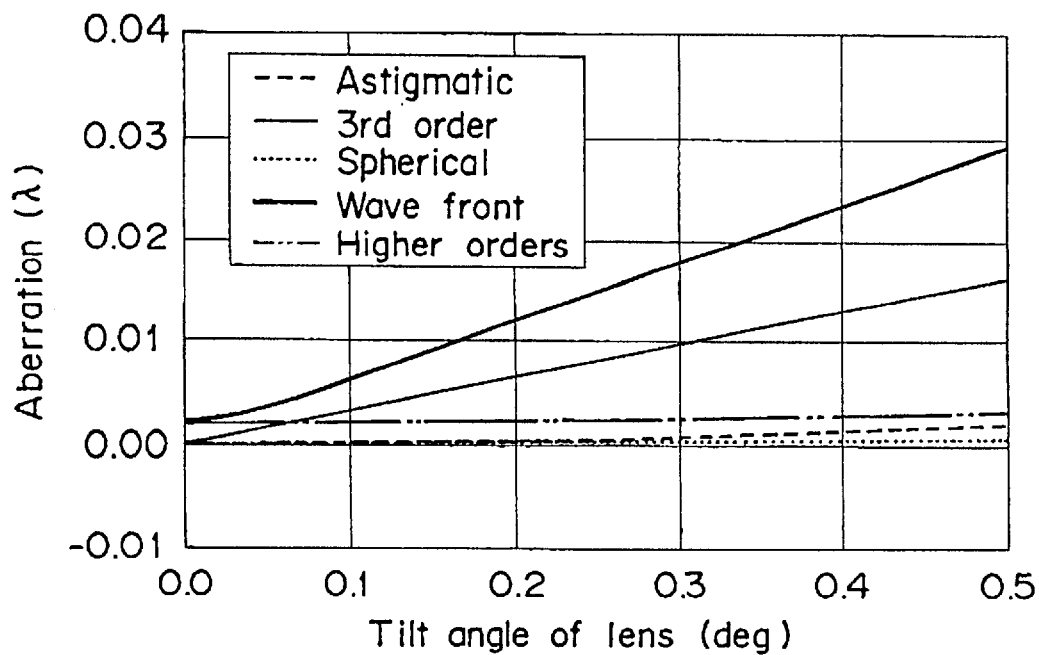
FIG. 14B is a graph of the relationship between respective aberrations in a case where the object lens (diameter of lens aperture 2.1, NA=0.35) is tilted on an optical recording medium (thickness 1.2 mm) in the optical head in the second embodiment.

FIG. 14 shows variations in respective aberrations when only the object lens 19 is tilted on the optical recording medium 17. It should be noted that FIG. 14A shows aberrations for the central wavelength of the laser diode 14 of 660 nm and the diameter of the aperture of 3.6 mm (NA=0.6 for f=3.0 mm), and FIG. 14B shows aberrations for the central wavelength of the laser diode 25 of 795 nm and the diameter of the aperture of 2.1 mm (NA=0.35 for f=3.0 mm).

Figure 15A:
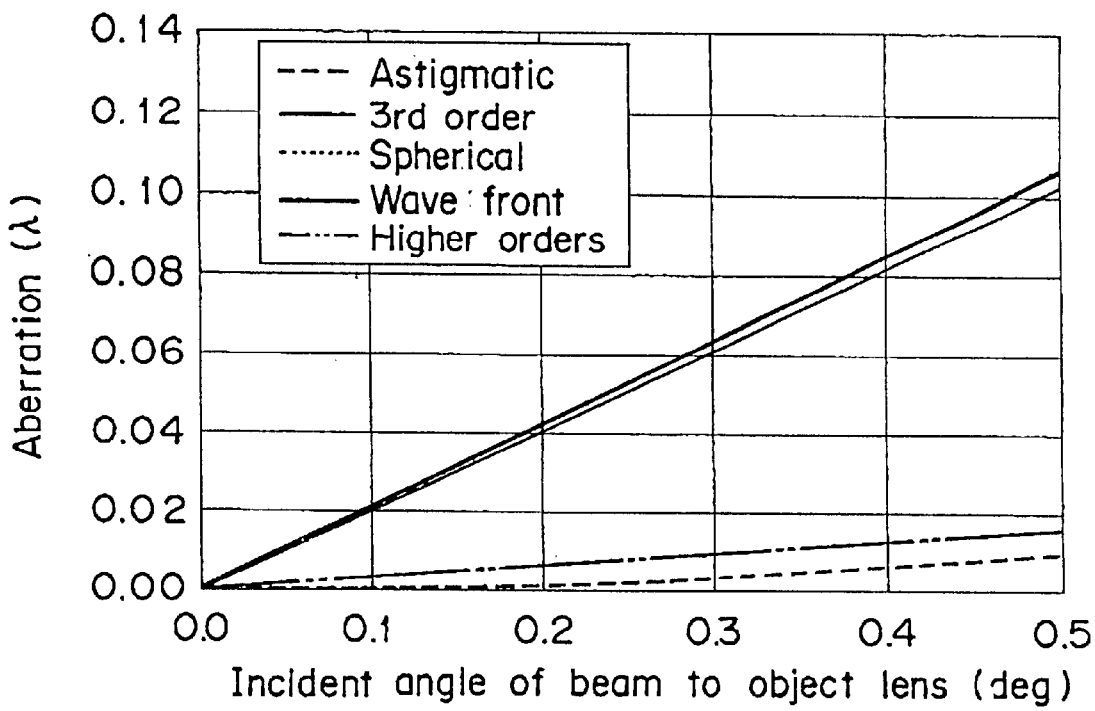
FIG. 15A is a graph of the relationship between respective aberrations when incident light of a light beam with respect to the object lens (diameter of lens aperture 3.6, NA=0.6) is tilted on the optical recording medium (thickness 0.6 mm)
Figure 15B:
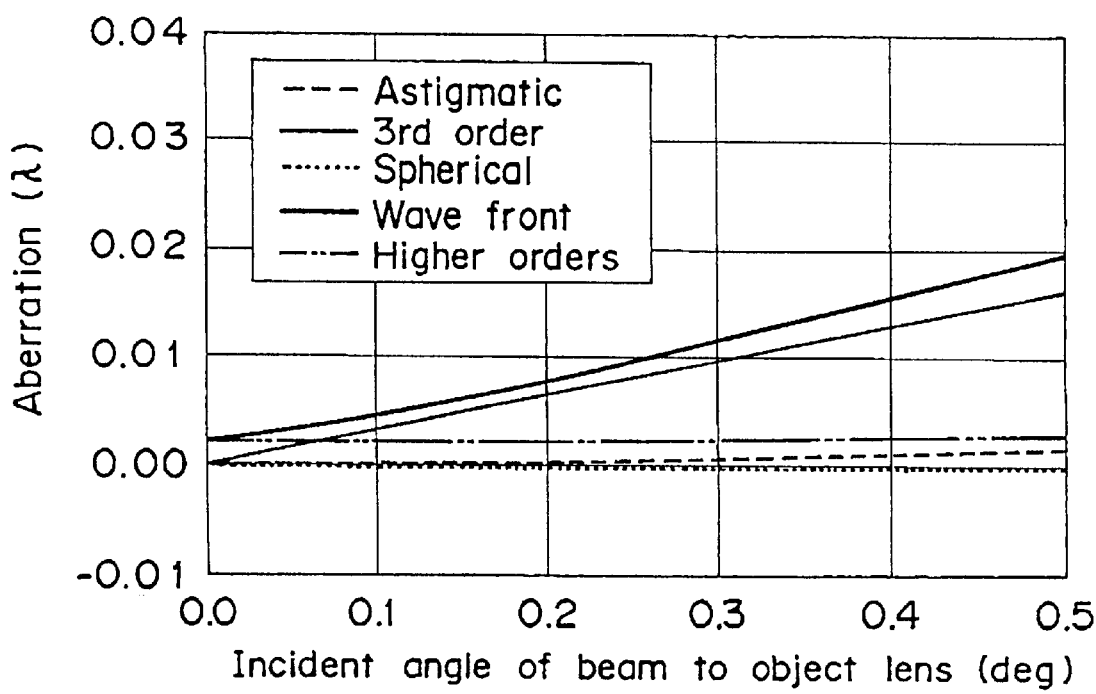
FIG. 15B is a graph of the relationship between respective aberrations in a case where incident light of a light beam with respect to the object lens (diameter of lens aperture 2.1, NA=0.35) is tilted on the optical recording medium (thickness 0.6 mm) in the optical head in the second embodiment.

FIGS. 15A and 15B show variations in respective aberrations when the incident angle of the light beam to the object lens is titled on optical recording medium 17, 18. It should be noted that FIG. 15A shows aberrations for the central wavelength of the laser diode 14 of 660 nm and the diameter of the aperture of 3.6 mm (NA=0.6 for f=3.0 mm), and FIG. 15B a condition in which the central wavelength of the laser diode 25 is 795 nm and the diameter of the aperture 2.1 mm (NA=0.35 for f=3.0 mm).

It can be understood from linear slopes of straight lines representing respective aberrations in FIGS. 14A and B and 15A and B that $$Lt3=0.205, \quad (9)$$

$$Lb3=0.205, \quad (10)$$

$$Lt4=0.032, \quad (11)$$

and $$Lb4=0.032. \quad (12)$$

Then, it is found that the object lens satisfies the following conditions sufficiently that $$0.5 < |Lb3|/|Lt3|, \quad (7)$$

and $$0.5 < |Lb4|/|Lt4|. \quad (8)$$

It is assumed here that the optical recording medium 17 is set such that light beam 11 is incident vertically, and the object lens 19 is attached to the lens holder 27 such that the central axis of the object lens 19 is horizontal with respect to the light beam 11. Then, the light beam 11 condensed through the object lens 19 is irradiated as a very small light spot on the surface of the optical recording medium 17. There exists in the light spot coma aberration of 40 m$\mu$ in the positive direction of the x-axis due to superposition of the coma aberration of collimating lens 8 and the coma aberration of the object lens 19.

Figure 13A:
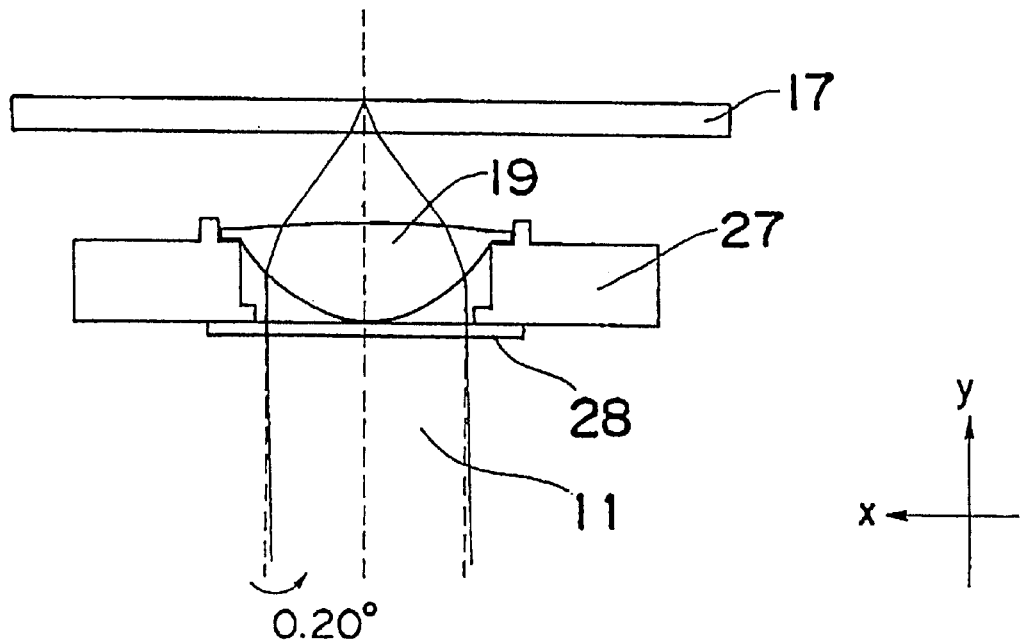
FIGS. 13A and 13B are enlarged sectional views of the periphery of the object lens of the optical head of the second embodiment for different optical recording media.

In order to cancel the coma aberration of the light spot, the light beam 11 is tilted by approximately 0.20° in a direction as shown in FIG. 13A, whereby the coma aberration is varied by 40 m$\mu$ in a negative direction of the x-axis as shown by equation (10). Thus, the coma aberration of the light spot can be canceled. It should be noted that the angle of tilt for the light beam 11 is represented as 2.0° (ten times as large as 0.20°) in FIG. 13A for the ease of understanding. The graph of FIG. 15A shows clearly that the astigmatic aberration of the light spot remains substantially zero.

Figure 13B:
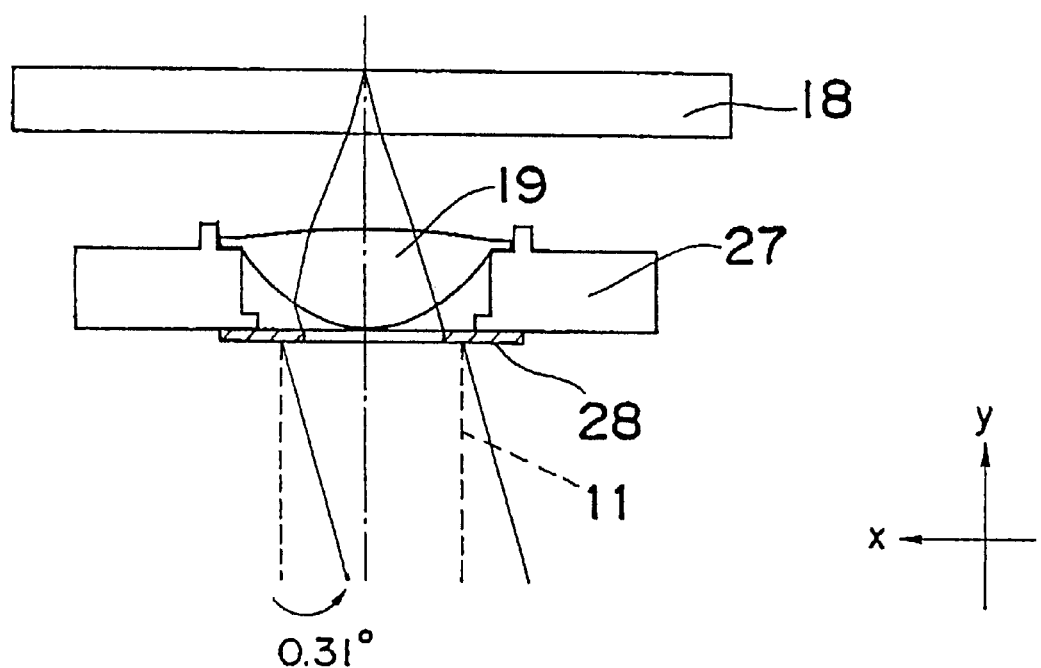

Next, as shown in FIG. 12B, the optical recording medium 18 is set such that the light beam 26 is incident vertically and the light beam 26 is further adjusted such that it is parallel to the central axis of the object lens 19. At this time, the light beam 26 condensed through the object lens 19 is irradiated as a minute light spot on the surface of the optical recording medium 18, Thus, there exists in the light spot coma aberration of 10 m$\mu$ in the positive direction of the x-axis due to the coma aberration of the collimating lens 24. In order to cancel the coma aberration of the light spot, the light beam 26 is tilted by approximately 0.31° in a direction as shown in FIG. 13B. Then, the coma aberration is varied by 10 m$\mu$ in the positive direction of the x-axis as shown by equation (10), so that the coma aberration of the light spot can be canceled. It should be noted that the angle of tilt of the support axis of the light beam 11 is represented as 3.1° (ten times as large as 0.31°) in FIG. 13B for the ease of understanding. The graph of FIG. 15B shows clearly that astigmatic aberration of the light spot remains substantially zero.

By performing adjustment in the above described manner, it is possible to reduce coma aberration to practically zero and to eliminate astigmatism either when a minute light spot is formed on the optical recording medium 17 by using the light beam 11 or on the optical recording medium 18 by using the light beam 26. Thus, favorable recording and reproduction are possible free of degradations of signals on recording and on reproduction.

While this embodiment is explained based on a case in which the object lens is a single lens both surfaces of which are aspherical, it can be understood that similar advantages can be obtained by using a unit lens comprised of a plurality of lenses.

Further, the lens holder employed in this embodiment is held by the support axis in a freely rotatable and slidable manner. However, it may be replaced by a lens holder supported by four metallic suspensions to be translational in a focusing direction (direction of y-axis in FIG. 11) and in a tracking direction (direction of x-axis in FIG. 11) for use in an optical head, whereby similar advantages can be obtained.

Further, in this embodiment, the light beams 11, 26 are tilted with respect to the central axis of the object lens 19 to correct coma aberration of the light spot generated by the respective light sources. However, similar advantages can be obtained in correcting coma aberration for either one of the light beams by performing adjustments to tilt the object lens 19, and then to correct coma aberration for the other of the light beams by inclining the light beam with respect to the central axis of the object lens 19. The graphs of FIGS. 14A and B on the tilt of the lens shows clearly this fact is substantially similar to the graphs of FIGS. 15A and B on the tilt of the beam.

It is preferably that the object lens has a most suitable NA value depending on film thickness of the various optical recording media or depending on recording densities for the data. For this purpose, the numerical aperture (NA) of an object lens employing one light source preferably differs from another object lens employing another light source.

As explained above, in the above-mentioned embodiments, an optical head of simple structure is provided at low cost which is capable of performing favorable recording and reproduction without degrading signals on recording and reproduction. When recording and reproduction are performed on a variety of optical recording media, practically zero coma aberration of spot lights formed on respective optical recording media surface occur. Transmittance of the light beam to a spot light can be improved by employing an object lens with no grating.

In systems dealing with signals from optical disks of high density in which tilt in tangential directions may immediately lead to degradation in signal quality, it is also required to perform correction of tangential tilt in addition to the correction of radial tilt. Embodiments described below solve this problem.

Next, an optical head of a third embodiment of the invention is explained. In the optical head, tilt of the optical recording medium is detected, and a controller changes the optical axis or incident angle of the light beam to an object lens according to the detected tilt of the optical recording medium, in order to generate coma aberration Lc intentionally. The generated coma aberration decreases the coma aberration due to the tilt of the optical recording medium.

Preferably, the object lens satisfies a condition that $$|Lc|/|La|<0.3, \quad (13)$$

wherein Lc and La denote a third order coma aberration component and a third order astigmatic aberration component of wave front aberration that change when the angle of an incident light beam on the object lens is varied by a unit angle, respectively. When the coma aberration is changed according to the optical axis of the incident light beam, as mentioned above, astigmatic aberration is also affected for a conventional object lens. However, because the astigmatic aberration deteriorates the quality of spot light formed by the object lens, it is desirable to make astigmatic aberration as small as possible, preferably below about 20 $\mu$m. If the coma aberration is assumed to be equal to or smaller than about 60 μm, by considering the practical tilt of the optical disk and tolerances of the components, the upper limit of the ratio |Lc|/|La| is preferably set to about 0.3 by considering the coma and astigmatic aberrations.

Figure 16:
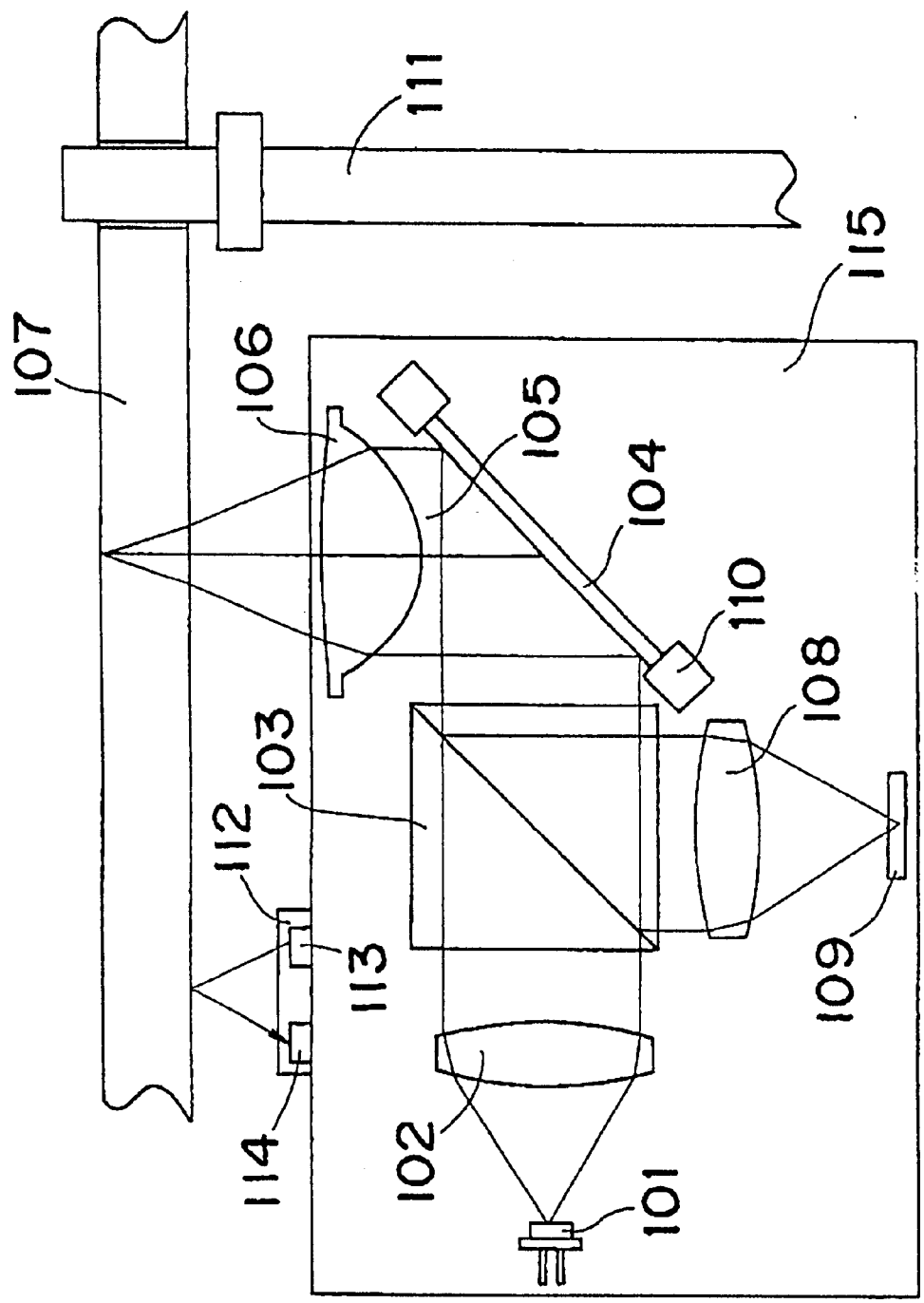
FIG. 16 is a schematic view of an optical head of a first example of a third embodiment of the present invention.

FIG. 16 is a schematic view of an example of the optical head of the third embodiment of the present invention. An optical recording medium 107 is set to a disk driving device 111. In order to record and reproduce data on tracks of the optical recording medium 107, an optical head 115 is provided to be freely movable in radial directions of the optical recording medium 107, and the optical head 115 is driven by a driving means (not shown) for the optical head. The optical head 115 comprises a disk tilt sensor 112. A beam emitted from a light emitting diode (LED) 113 is reflected by the optical recording medium 107 and received by a photodetector 114 having four split portions.

Light emitted from a laser diode 101 which serves as a light source (having, for instance, an oscillating wavelength of 660 nm) becomes a parallel light beam 105 through the collimating lens 102. After the parallel light 5 passes through a beam splitter 103, the propagation direction thereof is changed from X-axis direction to Y-axis direction by a galvano-mirror 104.

An object lens 106 is provided as a means for condensing the light beam 105, and the light beam 105 condensed through the object lens 106 is irradiated as a minute light spot onto a surface of the optical recording medium 107. This light spot enables recording and reproduction of data.

The light beam 105 reflected at the optical recording medium 107 is condensed by a detecting lens 108 via the galvano-mirror 104 and the beam splitter 103 and is thereafter incident on a photodetector 109. The galvano-mirror 104 is supported at a bi-axial tilt actuator 110, and the optical axis of the light beam 105 can be changed into tangential directions and radial directions with respect to the disk. The photodetector 109 detects data signals recorded on the optical recording medium 107 from the incident light. It also detects focusing direction control signals and tracking direction error signals.

Table 3 shows concrete numerical values for the object lens 106. It should be noted that the optical recording medium 107 is a parallel, flat plate having a design wavelength of 660 nm, disk thickness of 1.2 mm, and refractive index of 1.56.

TABLE 3

Properties of object lens

| Items on object lens | | Values |
| --- | --- | --- |
| Focal length of object lens | (f) | 4.10 |
| Radius of curvature of a first surface of object lens | ($R_1$) | 2.5588 |
| Radius of curvature of a second surface of object lens | ($R_2$) | 556.1547 |
| Lens thickness of object lens | (d) | 1.522 |
| Refractive index of object lens | (n) | 1.60277 |
| Substrate thickness of disk | (t) | 1.2 |
| NA of object lens | (NA) | 0.43 |
| Conical constant of first surface | ($K_1$) | $-1.18550 \times 10^{-1}$ |
| Four-order aspherical coefficient of first surface | ($A1_4$) | $-3.15103 \times 10^{-3}$ |
| Sixth-order aspherical coefficient of first surface | ($A1_6$) | $-3.15103 \times 10^{-4}$ |
| Eighth-order aspherical coefficient of first surface | ($A1_8$) | $-3.15103 \times 10^{-5}$ |

TABLE 3-continued

Properties of object lens

| Items on object lens | | Values |
| --- | --- | --- |
| Tenth-order aspherical coefficient of first surface | ($A1_{10}$) | $-3.15103 \times 10^{-5}$ |
| Conical constant of second surface | ($K_2$) | $-3.15103 \times 10^{-3}$ |
| Fourth-order aspherical coefficient of second surface | ($A2_4$) | $-3.15103 \times 10^{-3}$ |
| Sixth-order aspherical coefficient of second surface | ($A2_6$) | $-3.15103 \times 10^{-4}$ |
| Eighth-order aspherical coefficient of second surface | ($A2_8$) | $-3.15103 \times 10^{-4}$ |
| Tenth-order aspherical coefficient of second surface | ($A2_{10}$) | $-3.15103 \times 10^{-5}$ |

Figure 17A:
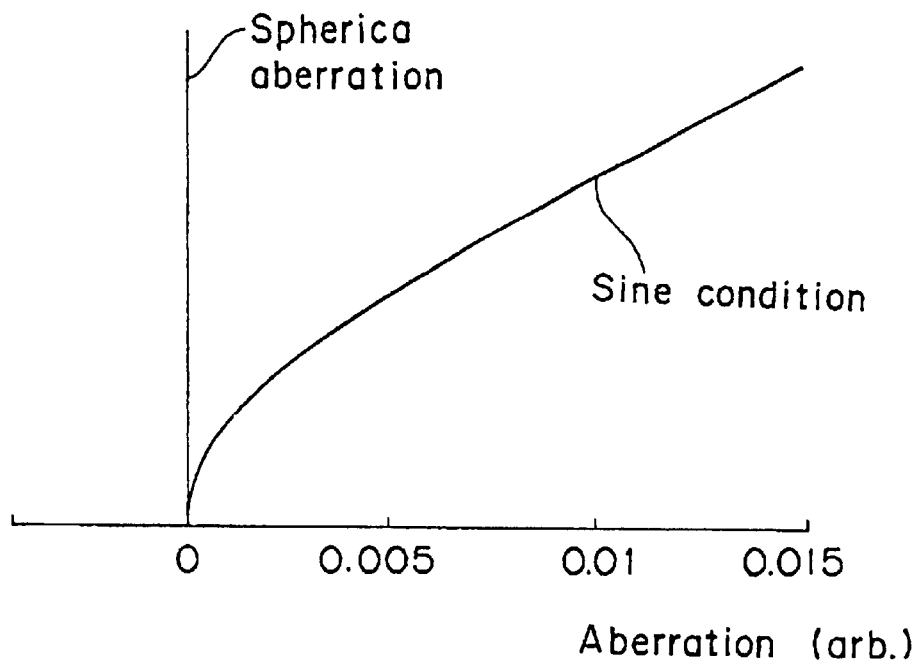
FIGS. 17A and 17B are graphs of aberration in sine condition and of astigmatic aberration of an object lens employed in the optical head.
Figure 17B:
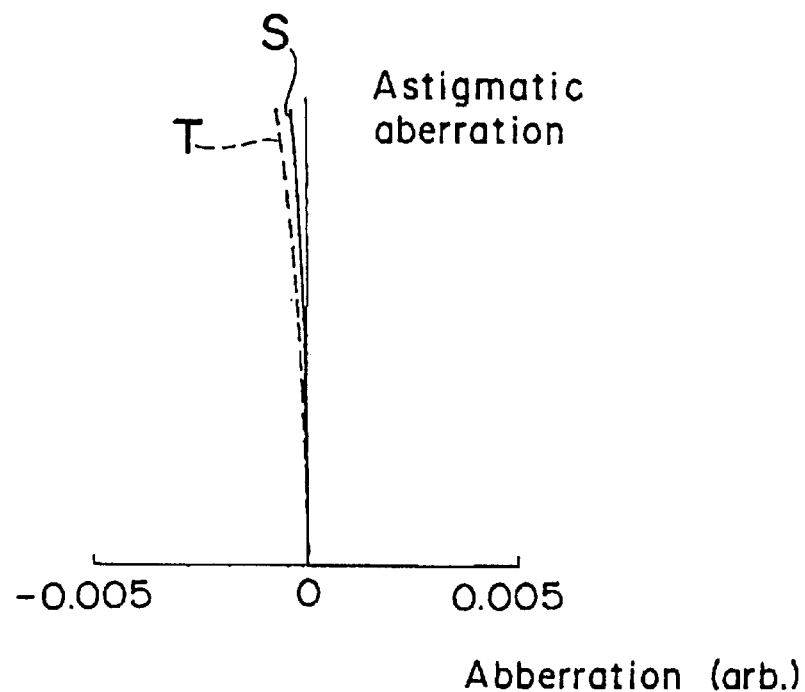

FIGS. 17A and 17B show aberrations of the object lens 106 in arbitrary unit. The sine condition of FIG. 17A is "under" as shown in FIG. 17B. Therefore, in a graph shown in FIG. 18 on the incident angle of the light beam 105 with respect to the object lens, it is understood that coma aberration occurs off the axis. Aberrations that are generated in a case of angular shifts by approximately 0.4° are mostly coma aberration, and other aberrations (such as astigmatic and spherical aberrations) do not contribute practically.

Figure 19:
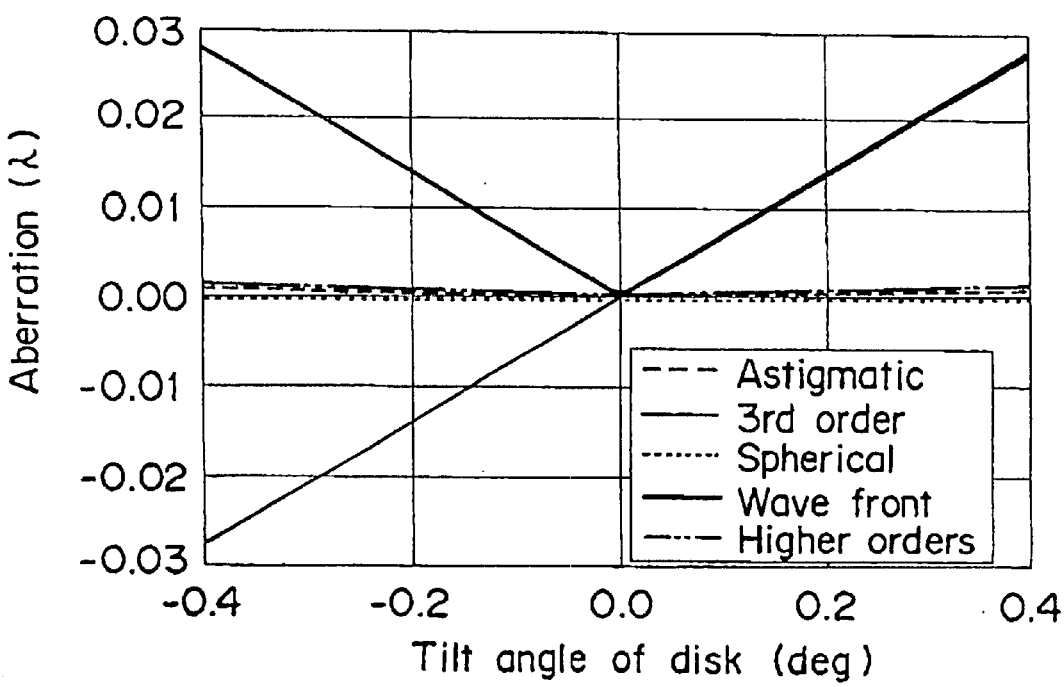
FIG. 19 is a graph of aberrations when an optical recording medium is tilted in the optical head.

FIG. 19 shows variations in respective aberrations of a light spot in a case where only the optical recording medium 107 is tilted. As shown in FIG. 19, only coma aberration is changed through the tilt of the optical recording medium 107, and the amount of variation is 70 mμ per unit angle.

It can be understood from this fact that coma aberration generated by tilting the optical recording medium 107 can be cancelled by controlling the tilt angle direction of the galvano-mirror 104 based on the amount and the direction of coma aberration generated by tilting the optical recording medium 107.

Figure 20:
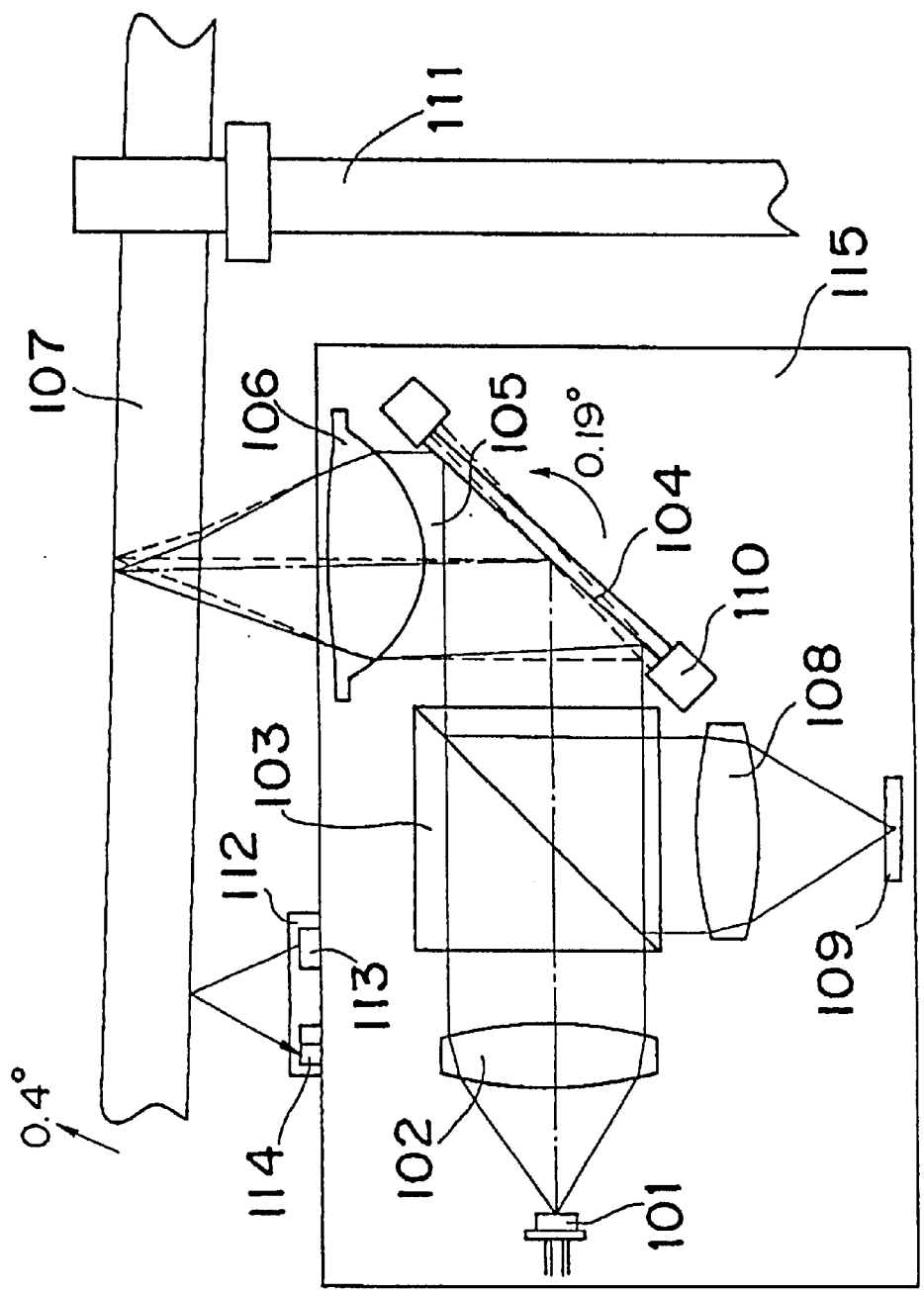
FIG. 20 is a schematic sectional view on tilt control performed in the optical head.

FIG. 20 shows a concrete example. In this optical system, it is assumed that no aberration exists on the spot when the optical recording medium is arranged vertically with respect to the optical axis of the object lens. In this case, the optical recording medium 107 is assumed to have a tilt, which may, for instance, be due to deformation of the optical disk, of 0.4° in a direction as shown in FIG. 20 in the proximity of a point of the spot irradiated from the object lens 106.

In this case, coma aberration of 27.5 mμ is generated as shown in FIG. 19 on a graph on the dependence of aberration of the object lens on the tilt angle of the disk. At this time, the beam that has been irradiated from the LED 113 of the disk tilt sensor 112 is reflected by the optical recording medium 107 and received by the photodetector 114. However, the tilt in the optical recording medium 107 changes the balance of the amount of received light of each of the four split portions in the photodetector 114, and the direction and the size of the tilt of the optical recording medium 107 are detected. Based on the detected signal, a control signal is sent to the biaxial tilt actuator 110.

Figure 18:
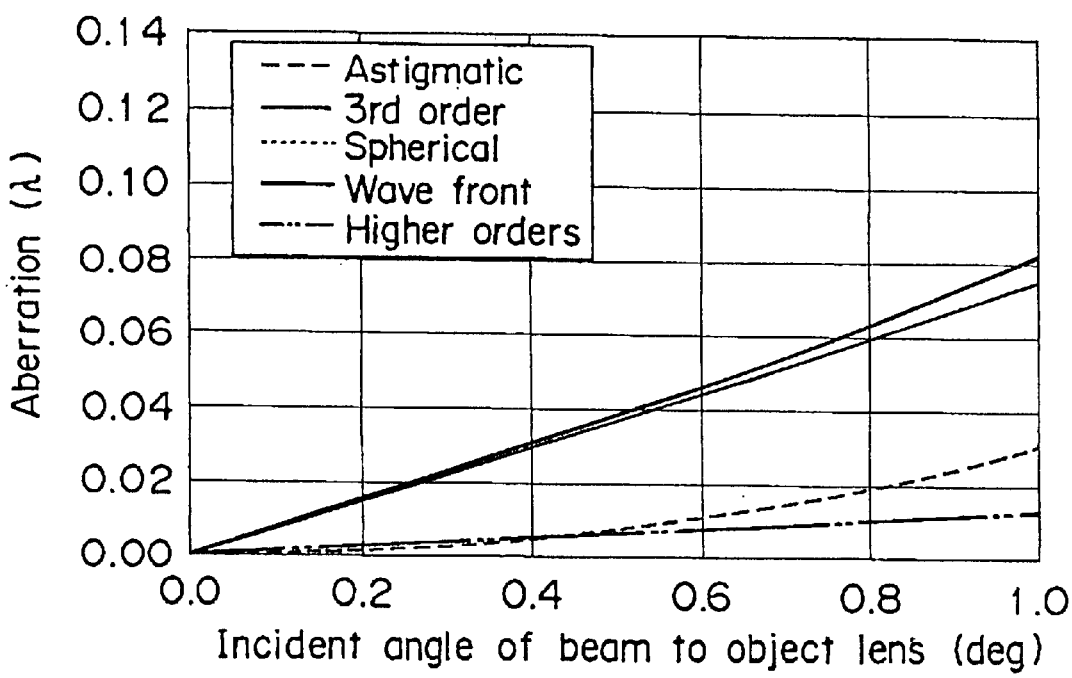
FIG. 18 is a graph of aberrations when an incident angle of a light beam of the object lens is tilted in the optical head.

As can be seen in FIG. 18, the coma aberration can be canceled by tilting the light beam to the object lens by 0.37°. Then, the coma aberration can be cancelled by sending a control signal to the biaxial tilt actuator 110 to rotate the galvano-mirror 104 by 0.19° in a direction as shown in FIG. 20. It should be noted that the coma aberration may be similarly cancelled even if the tilt of the optical recording medium 107 is not in the radial direction but in the tangential direction.

Further, when the tilt control has been performed, if the tilt of the optical recording medium 107 is equal to or smaller than 0.5°, only astigmatic aberration of not larger than 10 mμ is generated, even if the coma aberration is completely cancelled, as can be understood from the relationship between the graphs in FIGS. 18 and 19. Thus, the signal quality is not deteriorated largely.

By arranging the galvano-mirror 104 to be close to the object lens 106, variations can be suppressed in intensity distribution of the spot going out from the object lens 106 owing to variations in the optical axis when the tilt is controlled.

The disk tilt sensor 112 is employed in this embodiment as a means for detecting the tilt of the optical recording medium 107. However, similar advantages can be obtained when the tilt is detected based on variations in signals detected from the optical recording medium 107 due to the tilt thereof (e.g. jittering in RF signals).

Figure 21:
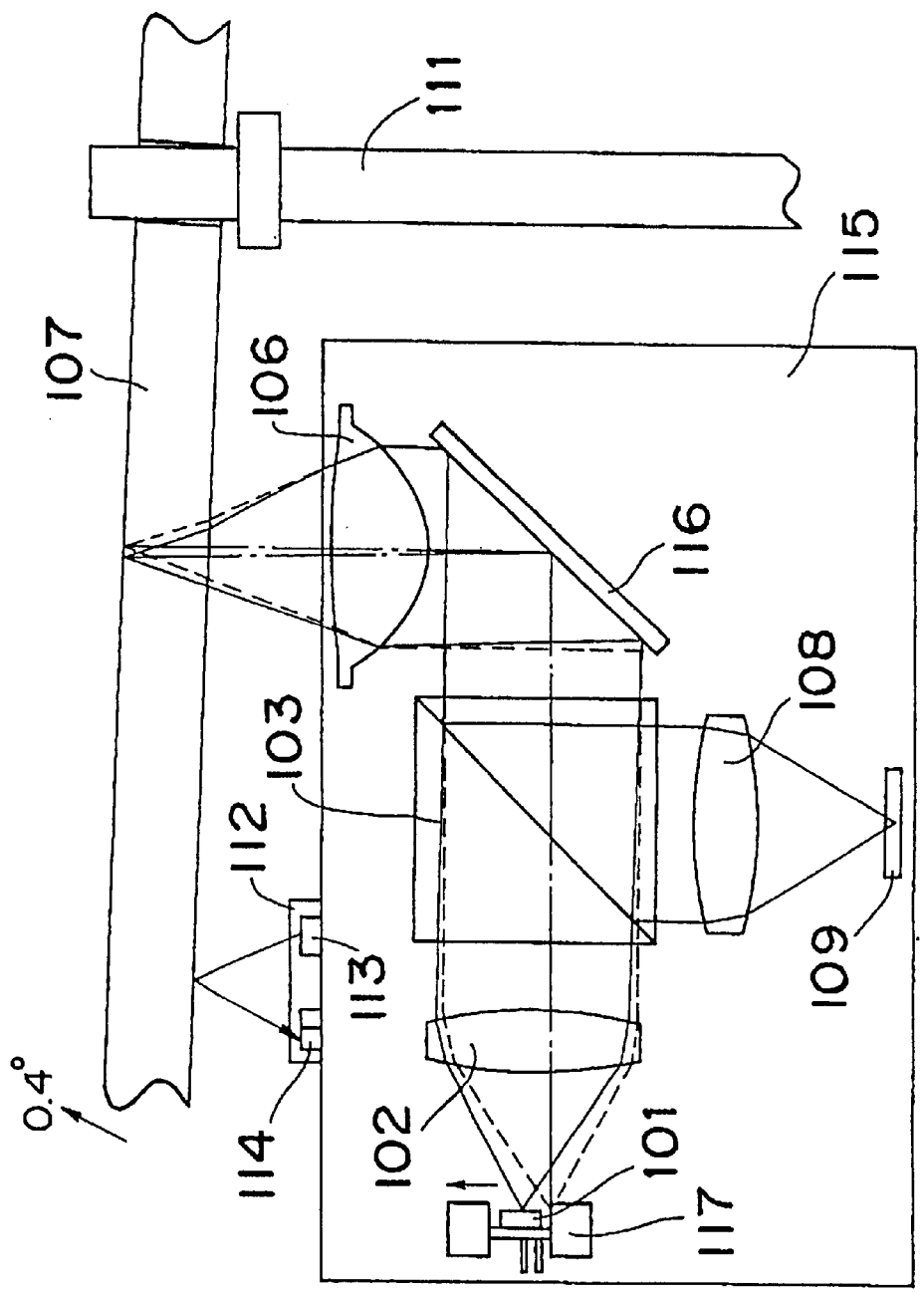
FIG. 21 is a schematic sectional view on tilt control performed in the optical head of a second example of the third embodiment of the invention.

FIG. 21 shows schematically a second example of the optical head according to the third embodiment. In the control means of this example, the galvano mirror 104 as shown in FIG. 20 and as explained in the first example is replaced by a reflection mirror 116, wherein the optical axis is tilted by supporting the laser diode 101 by a biaxial actuator 117.

A control signal is sent to the biaxial actuator 117 to make the laser diode 101 eccentric by a specified amount in a direction shown in FIG. 21, when the optical recording medium 107 is tilted in a direction as shown in FIG. 21 due to reasons such as deformation of the optical disk. Then, similarly to the first example, coma aberration can be eliminated.

Figure 22:
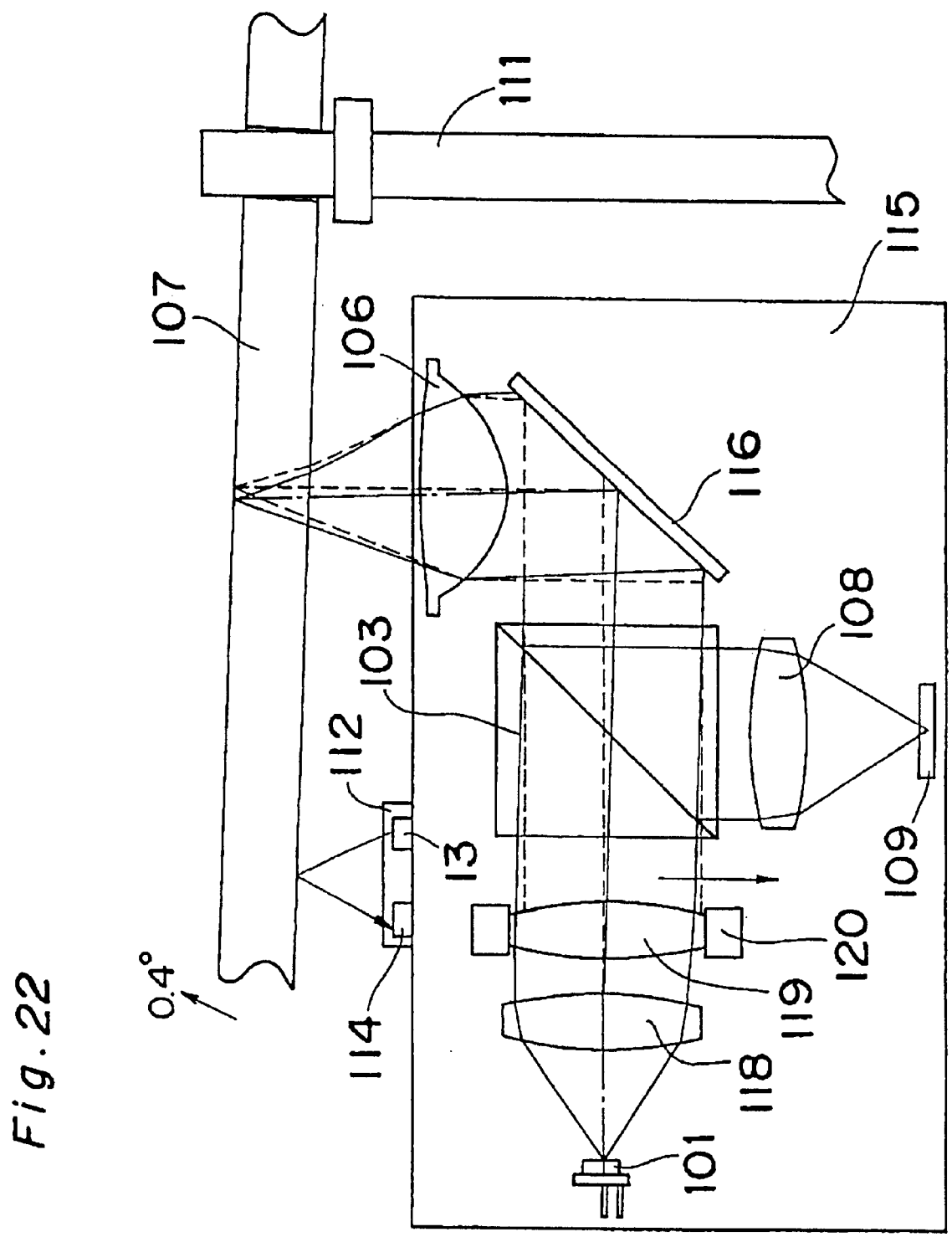
FIG. 22 is a schematic sectional view on tilt control performed in the optical head of a third example of the third embodiment of the invention.

FIG. 22 shows schematically a third example of the optical head according to the third embodiment. In the control means of this example, the collimating lens 102 shown in FIG. 21 in the second example is replaced by two groups of collimating lenses 118, 119, and the collimating lens 119 is supported by a biaxial actuator 120. Then, the optical axis can be made to be eccentric by the biaxial actuator 120.

When the optical recording medium 107 has been tilted in a direction as shown in FIG. 21 due to reasons such as deformation of the optical disk, a control signal is sent to the biaxial actuator 20 to make the collimating lens 119 eccentric by a specified amount in a direction shown in FIG. 21. Similarly to the second example, coma aberration can be eliminated.

Figure 23:
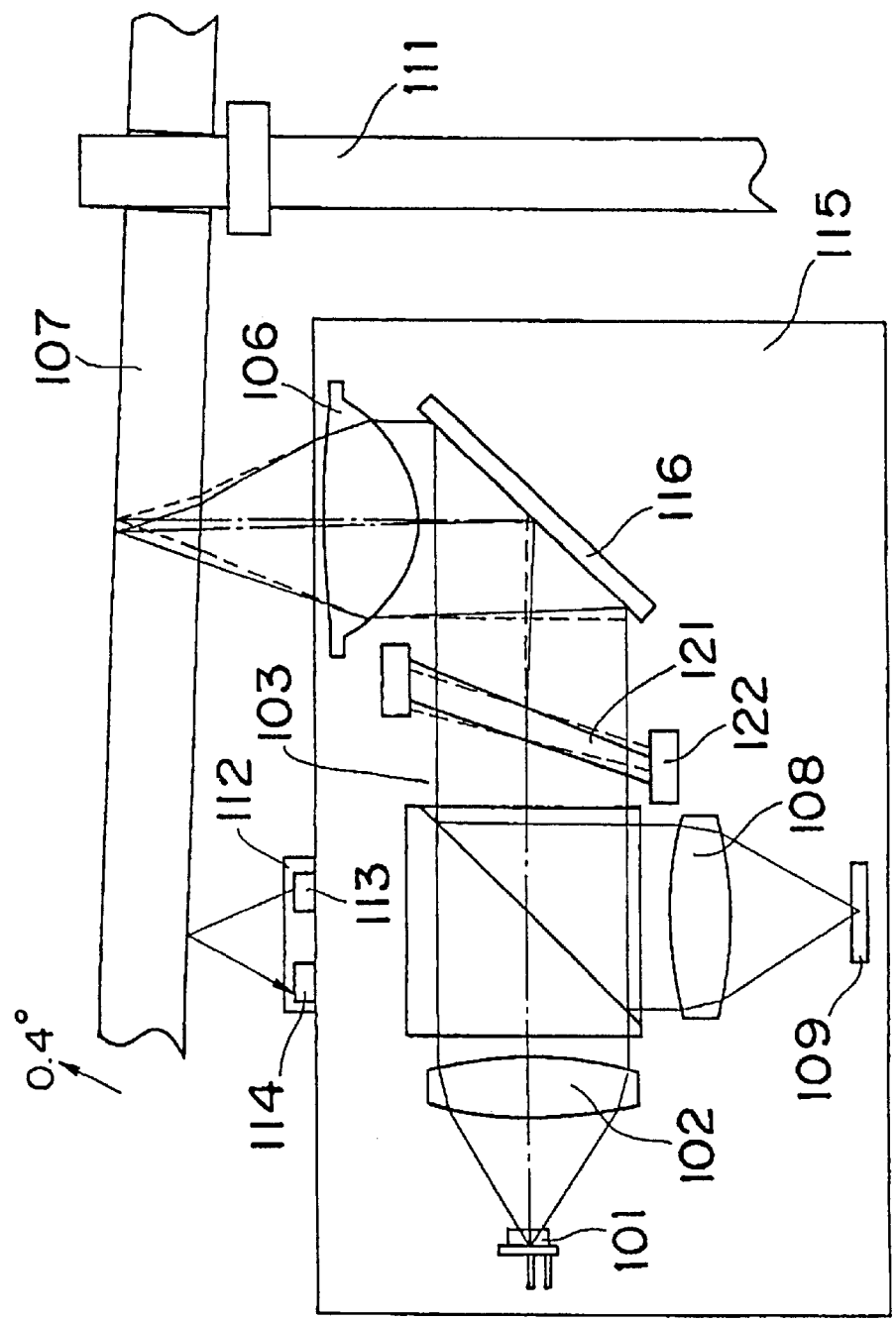
FIG. 23 is a schematic sectional view on tilt control performed in the optical head of a fourth example of the third embodiment of the invention.

FIG. 23 is a schematic view of a third example of the optical head according to the third embodiment of the invention. In the control means of this example, the galvano-mirror 104 shown in FIG. 20 in the first example is replaced by a reflection mirror 116, and a wedge-like prism 121 is inserted between a beam splitter 103 and the reflection mirror 116 and supported by a biaxial tilt actuator 122. Then, the optical axis is made eccentric.

When the optical recording medium 107 is tilted in a direction as shown in FIG. 23 due to reasons such as deformation of the optical disk, a control signal is sent to the biaxial actuator 122 to make the wedge-like prism 121 eccentric by a specified amount in a direction shown in FIG. 23. Then, similarly to the third example, the coma aberration can be eliminated.

As explained above in the examples of the third embodiment, the optical head is arranged to be capable of tilting a mirror for making the light beam eccentric in biaxial directions. Then, the mass of an object to be controlled can be decreased compared to conventional methods where the whole optical head is tilted for correction. With these arrangement, superior high frequency response performance can be achieved which has been impossible so far. The tilt servo in tangential directions can be realized at low cost and in a light-weighted and compact structure.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical head comprising:

a light source which emits a light beam; and a condenser which condenses the light beam emitted by said light source to form a light spot on a recording medium, said condenser comprising first and second object lenses mounted to a lens holder provided for a plurality of kinds of optical recording medium;

wherein said first and second object lenses satisfy two conditions that $$|Lt1|>|Lt2|,$$

and $$|Lb1|>|Lb2|,$$

wherein Lt1 and Lt2 denote third order coma aberration components of wave front aberration that change when angles of optical axes of said first and second object lenses are varied by a unit angle, respectively, and Lb1 and Lb2 denote third order coma aberration components of wave front aberration that change when angles of incident light beams on said first and second object lenses are varied by a unit angle, respectively.

2. The optical head according to claim 1, wherein said first and second object lenses satisfies a condition that $$NA1>NA2,$$

wherein NA1 and NA2 denote numerical apertures of said first and second object lenses.

3. The optical head according to claim 1, wherein said first object lens has a design wavelength different from that of said second object lens.

4. The optical head according to claim 1, further comprising a controller comprising a detector to detect focusing and tracking errors, said controller controlling said condenser in focusing and tracking directions according to the focusing and tracking errors.

5. An optical head comprising:

a first light source which emits a light beam;

a second light source which emits a light beam in a wavelength region different from that of said first light source; and a condenser which condenses the light beam emitted by said light source to form a light spot on a recording medium, said condenser comprising an object lens mounted to a lens holder;

wherein said object lens satisfies two conditions that $$0.5<|Lb1|/|Lt1|,$$

and $$0.5<|Lb2|/|Lt2|,$$

wherein Lt1 and Lt2 denote third order coma aberration components of wave front aberration that change when angles of optical axes of said object lens is varied by a unit angle relative to the incident light beams from said first light source and from said second light source, respectively, and Lb1 and Lb2 denote third order coma aberration components of wave front aberration that change when angles of the incident light beams from said first light source and from said second light source on said object lens are varied by a unit angle, respectively.

6. The optical head according to claim 5, further comprising a controller comprising a detector to detect focusing and tracking errors, said controller controlling said condenser in focusing and tracking directions according to the focusing and tracking errors.

7. An optical head comprising:

a light source which emits a light beam;

a condenser which condenses the light beam emitted by said light source to form a light spot on a recording medium;

a detector which detects a tilt of the recording medium; and a controller which tilts an optical axis of the light beam according to the tilt detected by said detector, wherein said condenser comprises an object lens, said object lens satisfying a condition that $|Lc|/|La|<0.3$, wherein Lc and La denote a third order coma aberration component and a third order astigmatic aberration component of wave front aberration that change when an angle of an incident light beam on said object lens is varied by a unit angle, respectively.

8. The optical head according to claim 7, wherein said controller comprises a galvano-mirror which tilts the optical axis of the light beam.

9. The optical head according to claim 7, wherein said controller comprises a means for making said light source eccentric.

10. The optical head according to claim 7, wherein said controller comprises a plurality of collimating lenses and makes one of said collimating lenses eccentric.

11. The optical head according to claim 7, wherein said controller comprises a prism in an optical path of the light beam and said controller controls said prism to tilt the optical axis of the light beam.

12. The optical head according to claim 7, wherein said controller comprises a detector to detect focusing and tracking errors, said controller controlling said condenser in focusing and tracking directions according to the focusing and tracking errors detected by said detector.

* * * * *